United States Patent
Hiratsuka et al.

(10) Patent No.: US 7,348,762 B2
(45) Date of Patent: Mar. 25, 2008

(54) BATTERY PACK AND METHOD FOR PRODUCING BATTERY PACK

(75) Inventors: Masaru Hiratsuka, Kanagawa (JP); Mitsuo Sakamoto, Tokyo (JP); Takao Sawaguchi, Miyagi (JP); Kazuhito Hatta, Fukushima (JP); Hiroyuki Yamada, Fukushima (JP)

(73) Assignee: Sony Corporation, Tokyo (JP)

( * ) Notice: Subject to any disclaimer, the term of this patent is extended or adjusted under 35 U.S.C. 154(b) by 192 days.

(21) Appl. No.: 10/834,532

(22) Filed: Apr. 29, 2004

(65) Prior Publication Data

US 2005/0017678 A1    Jan. 27, 2005

(30) Foreign Application Priority Data

May 1, 2003    (JP)    ............. P2003-126714

(51) Int. Cl.
*H02J 7/00*    (2006.01)
*H01M 10/38*    (2006.01)
*H01M 2/04*    (2006.01)

(52) U.S. Cl. ............. 320/134; 320/107; 429/123; 429/176

(58) Field of Classification Search ............. 320/107, 320/134; 429/123, 176
See application file for complete search history.

(56) References Cited

U.S. PATENT DOCUMENTS 6,218,041 B1    4/2001    Barbier 6,258,480 B1 *    7/2001    Moriwaki et al. .......... 429/176
6,492,058 B1 *    12/2002    Watanabe et al. .......... 429/121
7,166,389 B2 *    1/2007    Hiratsuka et al. .......... 429/176
2003/0017388 A1    1/2003    Furusaki

FOREIGN PATENT DOCUMENTS

| EP | 0917218 A2 | 5/1999 |
|---|---|---|
| EP | 0996178 A1 | 4/2000 |
| EP | 1406321 A2 | 4/2007 |
| JP | 05-062658 | 3/1993 |
| JP | 2000-156208 | 6/2000 |
| JP | 2000-306556 | 11/2000 |
| JP | 2001-102090 | 4/2001 |
| JP | 2001-256933 | 9/2001 |
| JP | 2002-050329 | 2/2002 |
| JP | 2002-151031 | 5/2002 |

OTHER PUBLICATIONS

European Search Report for Patent Application No. 04010323.6-1227.
Japanese Patent No. 2003-126714.

* cited by examiner

*Primary Examiner*—Bao Q. Vu
*Assistant Examiner*—Yalkew Fantu
(74) *Attorney, Agent, or Firm*—Sonnenschein Nath & Rosenthal LLP

(57) ABSTRACT

A battery element is housed and sealed in a package body, and further, packed together with a connecting board and a frame by the package body. A laminate material for sealing the battery element is used as an outer package material of a battery pack. Thus, the increase of volume for the pack is reduced as much as possible.

12 Claims, 22 Drawing Sheets

BATTERY PACK AND METHOD FOR PRODUCING BATTERY PACK

BACKGROUND OF THE INVENTION

1. Field of the Invention

The present invention relates to a battery pack and a method for producing it in which the volume of an outer package part is suppressed as much as possible.

This application claims priority of Japanese Patent Application No. 2003-126714, filed on May 1, 2003, the entirety of which is incorporated by reference herein.

2. Description of the Related Art

In recent years, a demand for an information device such as a note book type personal computer, a mobile communication device such as a portable telephone and a portable electronic device such as a video camera has been rapidly increased. As a power source of such electronic devices, a sealed type small secondary battery such as a nickel-cadmium battery, a nickel-metal hydride battery, a lithium-ion battery has been frequently employed. The characteristics of the lithium-ion secondary battery such as high voltage, high energy density and lightweight have been made a good use of among them, so that the lithium-ion battery has been employed in a variety of fields.

Especially, to cope with the leakage of liquid which causes a problem when liquid type electrolyte solution is used, for instance, a battery using a gel polymer film obtained by impregnating polymer with non-aqueous electrolyte solution as an electrolyte, or what is called a polymer lithium-ion secondary battery using a completely solid state electrolyte are proposed.

In the above-described battery, as shown in FIG. 1, a single cell 301 formed by laminating battery elements is ordinarily housed in a pair of upper and lower plastic cases 303 and 304 together with a connecting board 302 having a protective circuit or terminals to obtain a battery pack 300 (for instance, see Japanese Patent Application Laid Open No. 2002-8606).

However, in the above-described structure, the thickness of the plastic cases 303 and 304 needs to be 0.3 to 0.4 mm. Further, when a double side tape or a tolerance for fixing is taken into consideration, the thickness of about 0.8 to 1 mm is increased to the thickness of the battery. In an outer peripheral direction, a configuration for performing an ultrasonic welding to the upper and lower plastic cases 303 and 304 is needed. Accordingly, the thickness of about 0.7 mm is required therefor. Therefore, the battery pack 300 needs to increase its volume about 1.3 to 1.4 times as much as the battery.

SUMMARY OF THE INVENTION

The present invention is proposed by considering the above-described circumstances and it is an object of the present invention to provide a battery pack in which the increase of volume for the pack is decreased as much as possible without deteriorating a mechanical strength and the reliability of terminals and a method for producing the battery pack.

A battery pack of the present invention comprises: a battery element having a cathode, an anode and polymer electrolyte, terminals being drawn from the cathode and the anode, respectively; a package body having a first area in which a housing recessed part for housing the battery element is formed, a second area formed continuously to the first area and a third area provided continuously to the second area so as to be substantially perpendicular to the first area; a frame disposed in the periphery of the housing recessed part in which the battery element is housed; and a connecting board disposed in the frame to which the terminals are connected and having a terminal part electrically connected to an external device.

In the battery pack according to the present invention, the battery element is housed in the recessed part. The second area located in a side opposite to a side from which the terminals of the housed battery element are drawn is bent relative to the first area to cover a first surface of the battery element exposed outside therewith and unite the first area to the second area. The terminals of the battery element housed in the housing recessed part and covered with the second area are connected to the connecting board. The frame is disposed in the periphery of the housing recessed part in which the battery element is housed. The connecting board is provided in the frame. The third area of the package body is bent relative to the second area. A second surface side opposite to the first surface of the battery element housed in the housing recessed part of the first area and covered with the first area and the second area is covered with the third area and the third area is united to the first area.

In the battery pack according to the present invention as described above, a laminate material of the battery element is used as an outer package material of the pack so that volume efficiency is improved.

Further, in a method for producing a battery pack that comprises: a battery element having a cathode, an anode and polymer electrolyte, terminals being drawn from the cathode and the anode, respectively; a first package body having a housing recessed part for housing the battery element and a uniting piece provided in the periphery of the housing recessed part; a second package body having at least a first area with which a first surface of the battery element housed in the housing recessed part which is exposed outside is covered and a second area with which a second surface side opposite to the first surface is covered; a frame disposed in the periphery of the housing recessed part in which the battery element is housed; and a connecting board disposed in the frame to which the terminals are connected and having a terminal part electrically connected to an external device, according to the present invention, the method comprises the steps of housing the battery element in the housing recessed part of the first package body; covering the first surface of the battery element exposed outside with the first area of the second package body to unite the uniting piece to the first area; connecting the terminals of the battery element housed in the housing recessed part and covered with the first area of the second package body to the connecting board, disposing the frame in the periphery of the battery element and providing the connecting board in the frame; bending the second area of the second package body relative to the first area to cover the second surface side opposite to the first surface of the battery element housed in the housing recessed part of the first package body and covered with the first area with the second area and uniting the first package body to the second area of the second package body.

In the method for producing the battery pack according to the present invention as described above, the laminate film of the battery element is used as an outer package material, so that volume efficiency can be improved.

Further, a battery pack according to the present invention comprises: a battery element having a cathode, an anode and polymer electrolyte, terminals being drawn from the cathode and the anode, respectively; a first package body having a housing recessed part for housing the battery element and a uniting piece provided in the periphery of the housing recessed part; a second package body having at least a first area with which a first surface of the battery element housed in the housing recessed part which is exposed outside is covered and a second area with which a second surface side opposite to the first surface is covered; a frame disposed in the periphery of the housing recessed part in which the battery element is housed; and a connecting board disposed in the frame to which the terminals are connected and having a terminal part electrically connected to an external device.

In the battery pack of the present invention, the battery element is housed in the housing recessed part of the first package body. The first surface of the battery element exposed outside is covered with the first area of the second package body. The uniting piece is united to the first area. The terminals of the battery element housed in the housing recessed part and covered with the first area of the second package body are connected to the connecting board. The frame is disposed in the periphery of the housing recessed part in which the battery element is housed and the connecting board is disposed in the frame. The second area of the second package body is bent relative to the first area. The second surface side opposite to the first surface of the battery element housed in the housing recessed part of the first package body and covered with the first area is covered with the second area to unite the first package body to the second area of the second package body.

In the battery pack according to the present invention as described above, a laminate material of the battery element is used as an outer package material of the pack so that volume efficiency is improved.

Further, a method for producing a battery pack according to the present invention comprises: a first step of housing a battery element having a cathode, an anode and polymer electrolyte, terminals being drawn from the cathode and the anode, respectively in a housing recessed part of a first package body having the housing recessed part for housing the battery element and a uniting piece provided in the periphery of the housing recessed part; a second step of covering a first surface of the battery element housed in the housing recessed part which is exposed outside with a first area of a second package body having at least the first area with which the first surface is covered and a second area with which a second surface side opposite to the first surface is covered and uniting the uniting piece to the first area; a third step of connecting the terminals of the battery element housed in the housing recessed part and covered with the first area of the second package body to a connecting board having a terminal part electrically connected to an external device, disposing a frame in the periphery of the housing recessed part in which the battery element is housed and providing the connecting board on the frame; a fourth step of bending the second area of the second package body relative to the first area and covering the second surface side opposite to the first surface of the battery element housed in the housing recessed part of the first package body and covered with the first area with the second area; and a fifth step of uniting the first package body to the second area of the second package body.

In the method for producing the battery pack according to the present invention as described above, the laminate film of the battery element is used as an outer package material, so that volume efficiency can be improved.

Further, a battery pack according to the present invention comprises: a battery element having a cathode, an anode and polymer electrolyte, terminals being drawn from the cathode and the anode, respectively; a first package body having a housing recessed part for housing the battery, element and a uniting piece provided in the periphery of the housing recessed part; a second package body having a first area with which a first surface of the battery element housed in the housing recessed part of the first package body which is exposed outside is covered and a second area provided continuously to one side of the first area and harder than the first package body; a frame disposed in the periphery of the housing recessed part of the first package body in which the battery element is housed; and a connecting board disposed in the frame to which the terminals are connected.

In the battery pack of the present invention, the battery element is housed in the housing recessed part of the first package body. The first surface of the battery element exposed outside from the housing recessed part is covered with the first area of the second package body by uniting the uniting piece of the first package body to the first area of the second package body to draw outside the terminals of the battery element. The terminals of the battery element housed in the housing recessed part of the first package body and covered with the first area of the second package body are connected to the connecting board. The frame is disposed in the periphery of the housing recessed part of the first package body in which the battery element is housed and the connecting board is disposed in the frame. The second area of the second package body is bent back to a second surface side opposite to the first surface of the battery element housed in the housing recessed part of the first package body relative to the first area united to the uniting piece of the first package body by using the one short side of the first area as a supporting point to cover the housing recessed part of the first package body with the second area of the second package body and unite the second area of the second package body to the frame.

In the battery pack according to the present invention as described above, the second package body for packing the battery element is employed as a pack outer package material, so that volume efficiency is improved. In the battery pack, since the second package body as the pack outer package material is harder than the first package body, the deformation and deterioration of the battery element due to an external impact such as an impact owing to falling or the generation of flaws on the second package body is suppressed to prevent an external appearance from being poor. Further, in the battery pack, when the housing part of the first package body is covered with the second area of the second package body, the second area is bent back by using the one short side of the first area as a supporting point. Thus, the bent part of the second package body is decreased to suppress the generation of wrinkles or the like in the bent part.

Further, a method for producing a battery pack comprises: a first step of housing a battery element having a cathode, an anode and polymer electrolyte, terminals being drawn from the cathode and the anode, respectively in a housing recessed part of a first package body having the housing recessed part for housing the battery element and a uniting piece provided in the periphery of the housing recessed part; a second step of covering a first surface of the battery element with a first area of a second package body having the first area with which the first surface of the battery element housed in the housing recessed part of the first package body which is exposed outside the battery element is covered and a second area provided continuously to one side of the first area and harder than the first package body so as to draw the terminals of the battery element outside and uniting the uniting piece of the first package body to the first area of the second package body; a third step of connecting the terminals of the battery element housed in the housing recessed part of the first package body and covered with the first area of the second package body to a connecting board, disposing a frame in the periphery of the housing recessed part of the first package body in which the battery element is housed and disposing the connecting board in the frame and a fourth step of bending the second area of the second package body back to a second surface side opposite to the first surface of the battery element housed in the housing recessed part of the first package body relative to the first area united to the uniting piece of the first package body by using the one short side of the first area as a supporting point to cover the housing recessed part of the first package body with the second area of the second package body and unite the second area of the second package body to the frame.

In the method for producing the battery pack according to the present invention as described above, the second package body for packing the battery element is employed as a pack outer package material, so that volume efficiency is improved. In the method for producing the battery pack, since the second package body as the pack outer package material is harder than the first package body, a battery pack in which the deformation and deterioration of the battery element due to an external impact such as an impact owing to falling or the generation of flaws on the second package body is suppressed is obtained. Further, in the method for producing the battery pack, when the housing part of the first package body is covered with the second area of the second package body, the second area is bent back by using the one short side of the first area as a supporting point. Thus, the bent part of the second package body is decreased to suppress the generation of wrinkles or the like in the bent part.

Further, a battery pack according to the present invention comprises: a battery element having a cathode, an anode and polymer electrolyte, terminals being drawn from the cathode and the anode, respectively; a first package body having a housing recessed part for housing the battery element and a uniting piece provided in the periphery of the housing recessed part; a second package body with which a first surface of the battery element housed in the housing recessed part of the first package body which is exposed outside is covered and which is harder than the first package body; a third package body with which the housing recessed part of the first package body in a second surface side opposite to the first surface of the battery element is covered and which is harder than the first package body; a frame disposed in the periphery of the housing recessed part of the first package body in which the battery element is housed; and a connecting board disposed in the frame to which the terminals are connected.

In the battery pack of the present invention, the battery element is housed in the housing recessed part of the first package body. The first surface of the battery element exposed outside from the housing recessed part is covered with the second package body so that the terminals of the battery element are drawn outside by uniting the uniting piece of the first package body to the second package body. The terminals of the battery element housed in the housing recessed part and covered with the second package body are connected to the connecting board. The frame is disposed in the periphery of the housing recessed part of the first package body in which the battery element is housed and the connecting board is disposed in the frame. The housing recessed part of the first package body in the second surface side of the battery element is covered with the third package body and the frame provided in the periphery of the battery element is united to the third package body.

In the battery pack according to the present invention as described above, the second package body for packing the battery element is employed as a pack outer package material, so that volume efficiency is improved. In the battery pack, since the second package body and the third package body as the pack outer package materials are harder than that of the first package body, the deformation and deterioration of the battery element due to an external impact such as an impact owing to falling or the generation of flaws on the second package body and the third package body is suppressed to prevent an external appearance from being poor. Further, in the battery pack, since the outer package body is composed of two of the second package body and the third package body, the generation of wrinkles or the like is suppressed to improve the external appearance.

Further, a method for producing a battery pack according to the present invention comprises: a first step of housing a battery element having a cathode, an anode and polymer electrolyte, terminals being drawn from the cathode and the anode, respectively in a housing recessed part of a first package body having the housing recessed part for housing the battery element and a uniting piece provided in the periphery of the housing recessed part; a second step of covering a first surface of the battery element housed in the housing recessed part of the first package body which is exposed outside with a second package body harder than the first package body to unite the uniting piece of the first package body to the second package body; a third step of connecting the terminals of the battery element housed in the housing recessed part of the first package body and covered with the second package body to a connecting board, disposing a frame in the periphery of the housing recessed part of the first package body in which the battery element is housed and providing the connecting board between the frame and the battery element; and a fourth step of covering the housing recessed part of the first package body in a second surface side opposite to the first surface of the battery element with a third package body harder than the first package body to unite the frame provided in the periphery of the housing recessed part of the first package body in which the battery element is housed to the third package body.

In the method for producing the battery pack according to the present invention as described above, the second package body and the third package body for packing the battery element are employed as pack outer package materials, so that volume efficiency is improved. In the method for producing the battery pack, since the second package body and the third package body as the pack outer package materials are harder than that of the first package body, the deformation and deterioration of the battery element due to an external impact such as an impact owing to falling or the generation of flaws on the second package body and the third package body is suppressed to prevent an external appearance from being poor. Further, in the method for producing the battery pack, since the outer package body is composed of two of the second package body and the third package body, a battery pack is obtained in which the generation of wrinkles or the like in the second package body and the third package body is suppressed to improve the external appearance.

DETAILED DESCRIPTION OF THE PREFERRED EMBODIMENTS

Now, referring to the accompanying drawings, embodiments of a battery pack according to the present invention will be described below.

First Embodiment

Figure 1:
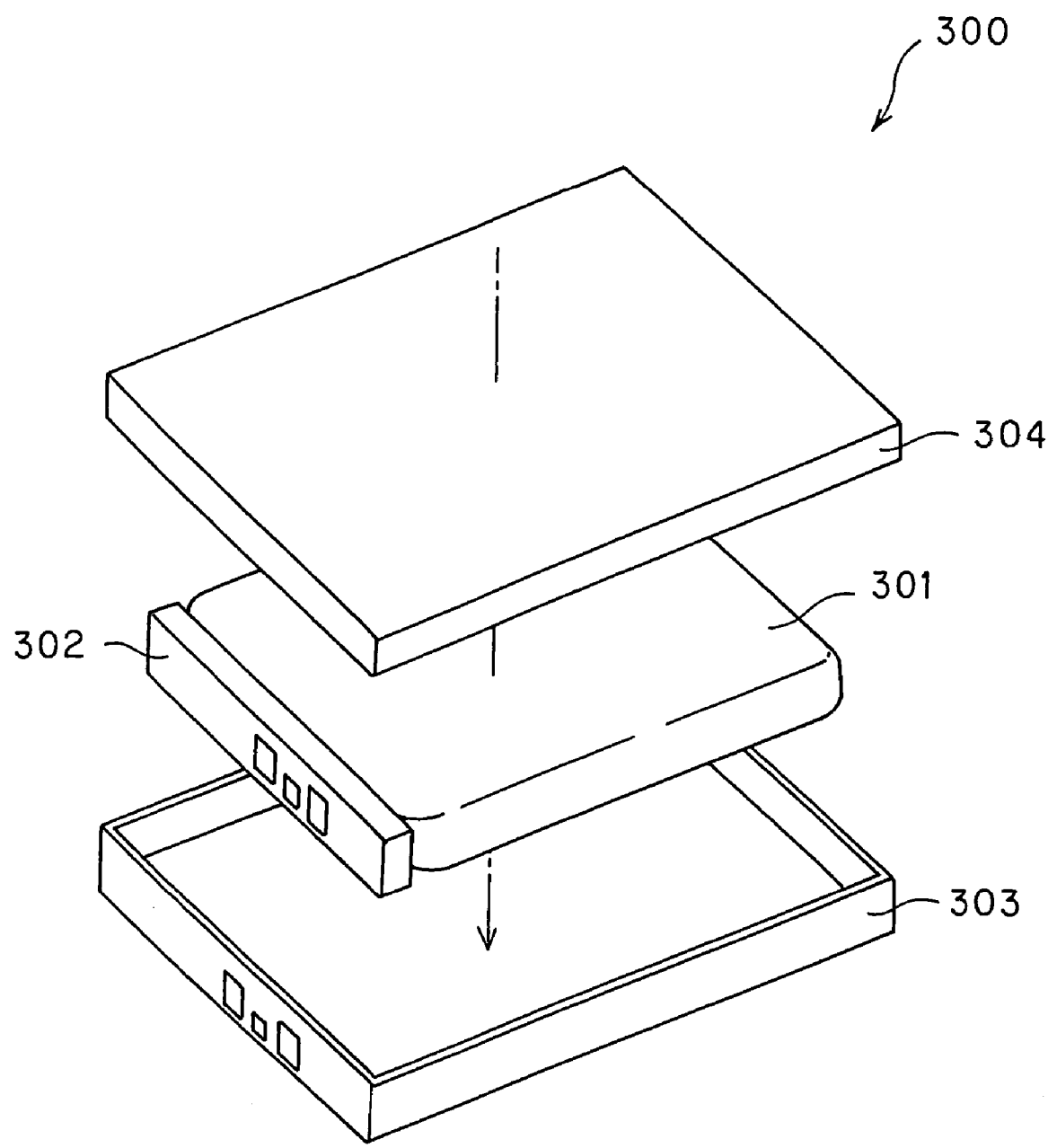
FIG. 1 is an exploded perspective view showing the structure of a usual battery pack using a plastic case.
Figure 2:
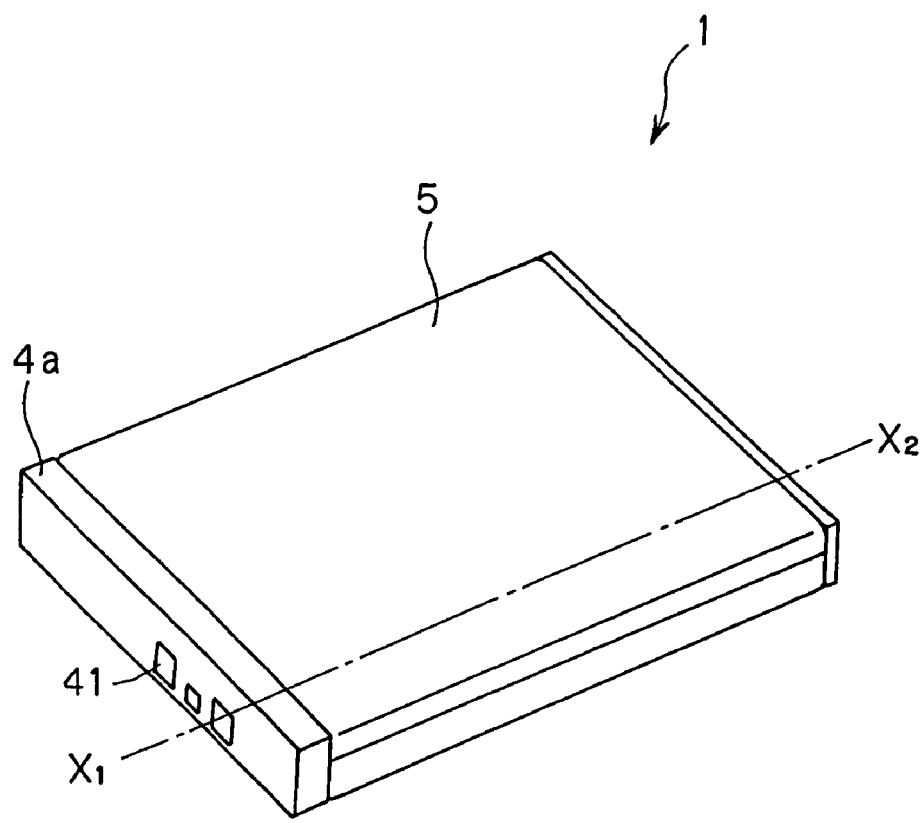
FIG. 2 is a perspective view showing one structural example of a battery pack to which the present invention is applied.
Figure 3:
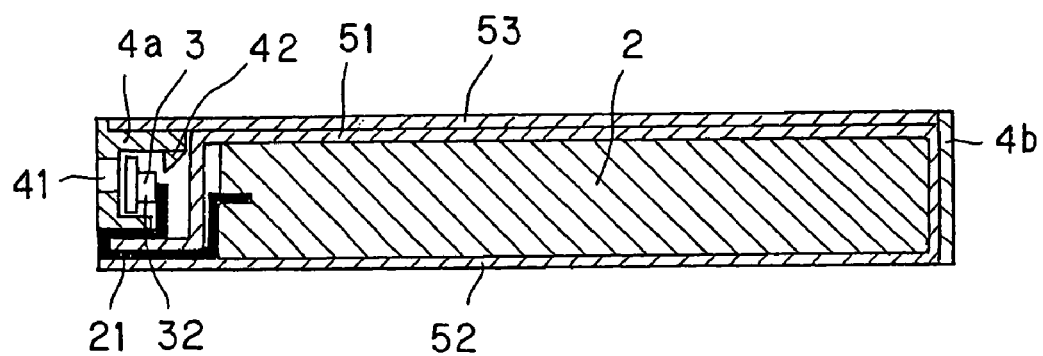
FIG. 3 is a sectional view taken along a line $X_1$-$X_2$ in FIG. 2.

FIG. 2 is a perspective view showing one structural example of a battery pack to which the present invention is applied. FIG. 3 is a sectional view taken along a line $X_1$-$X_2$ in FIG. 2. FIGS. 4 to 9 are diagrams for explaining a method for producing the battery pack.

The battery pack 1 comprises a battery element 2, a connecting board 3, a frame 4 and a package body 5. The battery element 2 is accommodated and sealed in the package body 5 and further packed together with the connecting board 3 and the frame 4 by the package body 5.

In the battery element 2, an elongated cathode and an elongated anode are laminated through a polymer electrolyte layer and/or a separator and a laminated body is coiled in a longitudinal direction. A cathode terminal 21 and an anode terminal 22 are respectively drawn outside from the cathode and the anode.

The cathode has a cathode active material layer formed on an elongated cathode current collector and the polymer electrolyte layer formed on the cathode active material layer. Further, the anode has an anode active material layer formed on an elongated anode current collector and the polymer electrolyte layer formed on the anode active material layer. The cathode terminal 21 and the anode terminal 22 are respectively connected to the cathode current collector and the anode current collector.

The cathode can be formed by using metallic oxide, metallic sulfide or specific polymer as a cathode active material depending on a kind of a desired battery. For instance, when a lithium-ion battery is formed, a lithium composite oxide including, as the cathode active material, $Li_xMO_2$ (In the formula, M represents one or more kinds of transition metals. X is different depending on charging and discharging states of the battery and ordinarily 0.05 or higher and 1.10 or lower.) or the like may be employed. As the transition metals M forming the lithium composite oxide, Co, Ni, Mn, etc. are preferable. As specific examples of the lithium composite oxide, $LiCoO_2$, $LiNiO_2$, $LiNi_yCo_{1-y}O_2$ (In the formula, y is larger than 0 and smaller than 1.), $LiMn_2O_4$, etc. may be exemplified. These lithium composite oxides can generate high voltage so that they are excellent cathode active materials in view of energy density. Further, as the cathode active materials, the metallic sulfides or the metallic oxides including no lithium such as $TiS_2$, $MoS_2$, $NbSe_2$, $V_2O_5$, etc. may be employed. In the cathode, a plurality of kinds of the cathode active materials may be used together. Further, when the above-described cathode active materials are used to form the cathode, a well-known conductive agent or a binding agent may be added thereto.

As an anode material, a material capable of being doped with lithium and being dedoped from lithium may be used. For instance, carbon materials such as non-graphitizable carbonaceous materials or graphitizable materials may be used. More specifically, carbon materials such as pyrocarbons, coke (pitch coke, needle coke, petroleum coke), graphites, vitreous carbons, organic polymer compound sintered bodies (carbonized materials obtained by sintering phenolic resins, furan resins, etc. at suitable temperature), carbon fibers, activated carbon, etc. may be employed. In addition thereto, as the materials capable of being doped with lithium and dedoped from lithium, polymers such as polyacetylene, polypyrrole or oxides such as $SnO_2$ may be used. When the anode is formed from these materials, a well-known binding agent may be added thereto.

The polymer electrolyte is obtained by containing gel electrolyte formed by mixing a polymer material, electrolyte solution and electrolyte salt in polymer. The polymer material has a feature soluble in the electrolyte solution. The polymer materials include silicon gel, acryl gel, acrylonitrile gel, modified polyphosphazene polymer, polyethylene oxide, polypropylene oxide and composite polymers, bridged polymers or modified polymers of them, etc. As fluorine polymers, for instance, various kinds of polymer materials such as poly (vinylidene fluoride), poly (vinylidene fluoride-co-hexafluoropropylene) or poly (vinylidene fluoride-co-trifluoroethylene) and mixtures of them may be used.

An electrolyte solution component is capable of dispersing the above-described polymer materials. As an aprotic solvent, for instance, ethylene carbonate (EC), propylene carbonate (PC) or butylene carbonate (BC) or the like is used. As the electrolyte salt, electrolyte salt soluble in the solvent is employed and is formed by combining cation with anion. As the cation, alkali metals or alkaline earth metals are used. As the anions, $Cl^-$, $Br^-$, $I^-$, $SCN^-$, $ClO_4^-$, $BF_4^-$, $PF_6^-$, $CF_3SO_3^-$, etc. are employed. As the electrolyte salt, specifically, lithium hexafluorophosphate or lithium tetrafluoroborate is used with a soluble concentration the electrolyte solution.

Figure 4:
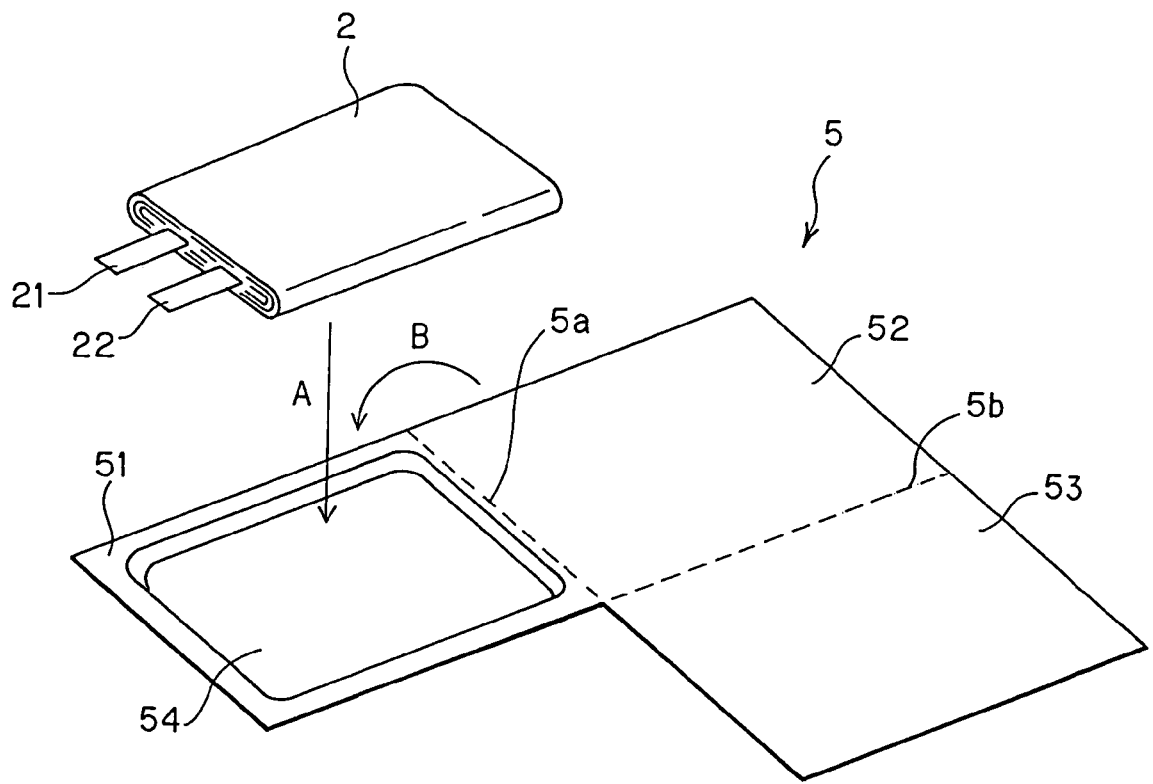
FIG. 4 is a perspective view showing a state in which a battery element is housed in a housing recessed part.

The package body 5 for accommodating the battery element 2 therein is, as shown in FIG. 4, formed in a substantially L-shape having a first area 51 with a substantially rectangular form, a second area 52 with a substantially rectangular form longitudinally continuous to the first area 51 and a third area 53 with a substantially rectangular form continuous to the direction of a short side of the second area 52 so as to be substantially perpendicular to the first area 51. In the first area 51, a housing recessed part 54 in which the battery element 2 is housed is previously formed.

Figure 5:
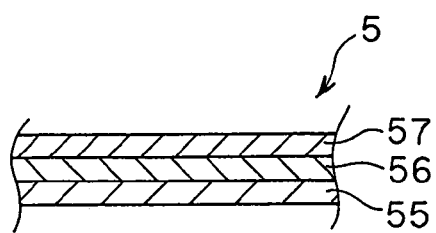
FIG. 5 is a sectional view showing the laminated structure of a package body.

The package body 5 has, as shown in FIG. 5, a laminated structure in which a polypropylene (PP) layer 55, an aluminum (Al) layer 56 and a nylon layer (Ny) 57 are laminated in order from inside. Here, the aluminum layer 56 prevents water from entering an inner part. The polypropylene layer 55 prevents the deterioration of the polymer electrolyte and serves as a uniting surface of the package body 5. That is, when the package body 5 is united, the polypropylene layers 55 are opposed to each other and heat-sealed at about 170° C. The nylon layer 57 gives a prescribed strength to the package body 5.

The structure of the package body 5 is not limited to the above-described structure and a laminate film having various kinds of materials and laminated structures may be employed. Further, a uniting method thereof is not limited to a heat sealing method.

As the materials for forming the package body, for instance, aluminum, polyethylene terephthalate (PET), cast polypropylene (CPP), acid modified polypropylene, ionomer, etc. may be exemplified.

In the present invention, a laminate material for sealing the battery element 2 is used also as an outer package material of the battery pack 1. Thus, a plastic case is not required to improve volume efficiency.

Initially as shown by an arrow mark A in FIG. 4, the battery element 2 is accommodated in the housing recessed part 54 provided in the first area 51 of the package body 5. At this time, the terminal side of the battery element 2 is disposed to be opposite to the second area 52.

Then, as shown by an arrow mark B, the second area 52 is bent to the first area 51 in a bending line 5a. Thus, the first surface of the battery element 2 housed in the housing recessed part which is exposed outside is covered with the second area 52.

Then, the first area 51 is united to the second area 52. The uniting is carried out by allowing the polypropylene layer sides of the first area 51 and the second area 52 to be opposed to each other and heat-sealing them at about 170° C.

Figure 9:
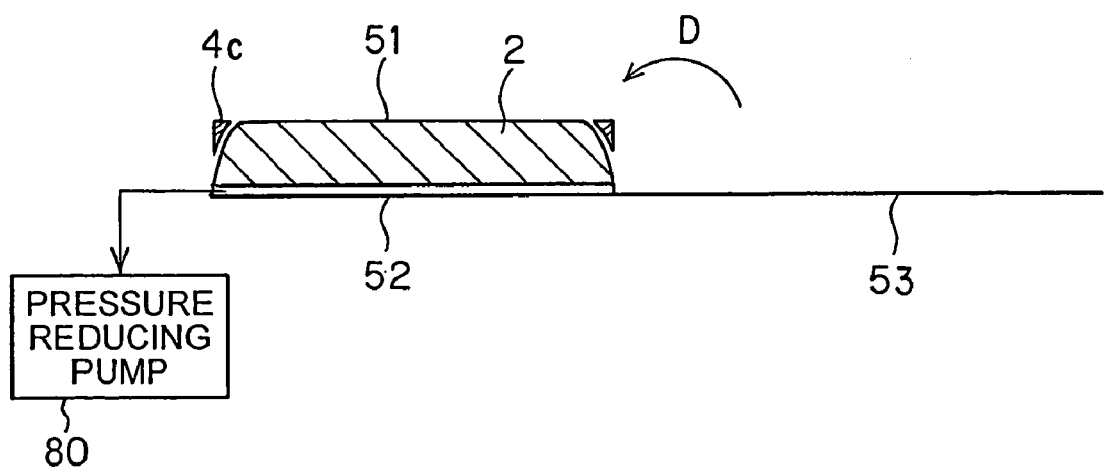
FIG. 9 is a sectional view showing a state that the frame is disposed in the periphery of the housed battery element.

At this time, as shown in FIG. 9, a pressure reducing pump 80 is used to reduce pressure as well as a uniting. The battery element 2 is covered with and sealed by the first area 51 and the second area 52 due to a suction force. At this time, the cathode terminal 21 and the anode terminal 22 of the battery element 2 are sandwiched in between the uniting surfaces of the first area 51 and the second area 52 to be drawn outside the package body 5.

As shown in FIG. 9, the pressure is reduced to suck the first area 51. Thus, the battery element 2 accommodated in the housing recessed part 54 is drawn to have a substantially trapezoidal form in which a second surface side as the bottom surface side of the housing recessed part 54 is small and the first surface side as an opening side is large.

Subsequently, the cathode terminal 21 and the anode terminal 22 are connected to a terminal part 31 of the connecting board 3. The terminal part 31 is electrically connected to an external device. Further, in the connecting board 3, a protective circuit chip 32 or the like is arranged.

Figure 6:
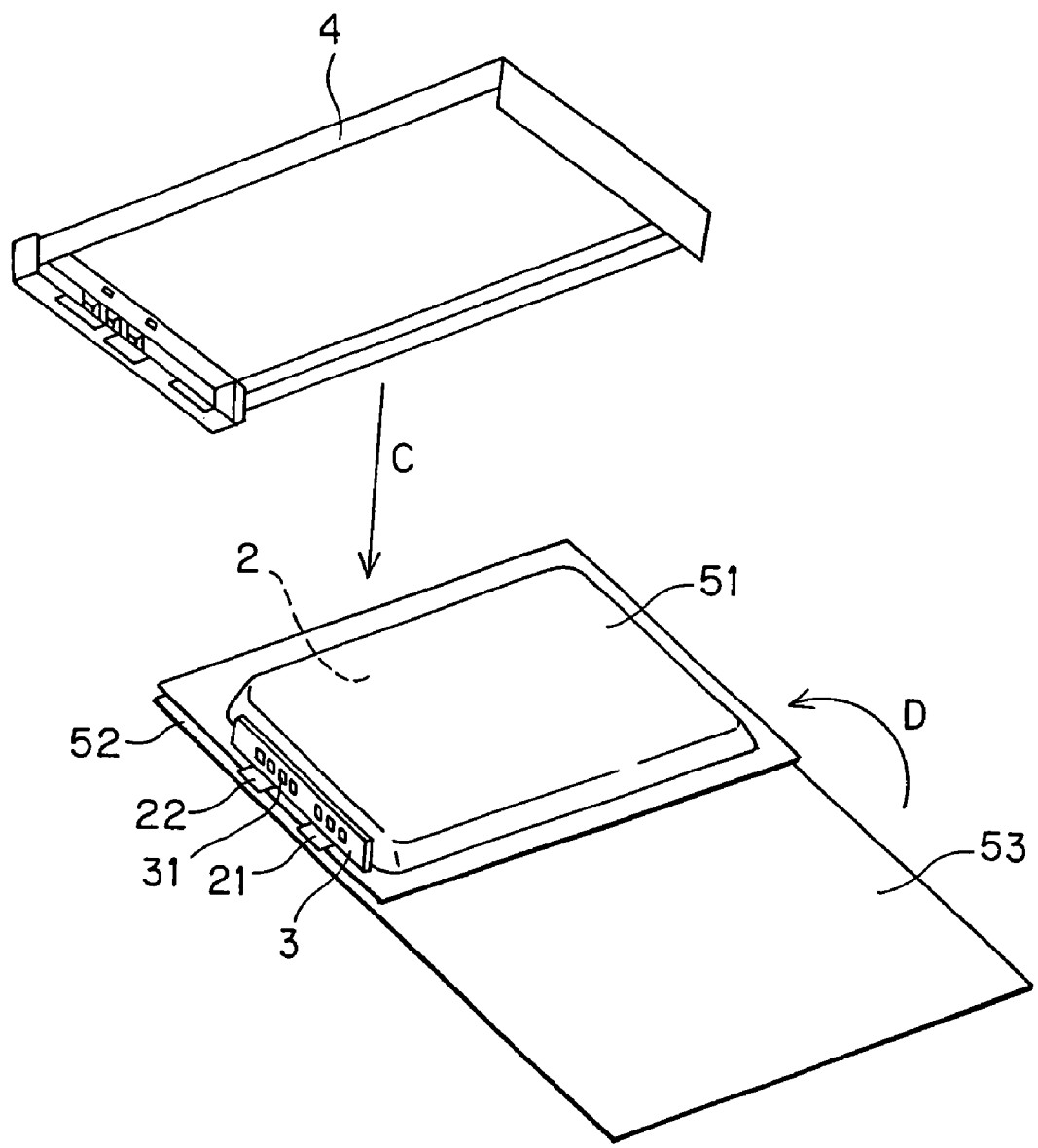
FIG. 6 is a perspective view showing a state that a frame is disposed in the periphery of the housed battery element.

As shown by a central arrow mark C in FIG. 6, in the periphery of the battery element 2 accommodated in the housing recessed part 54 of the first area 51 and covered and sealed with the second area 52, the frame 4 is disposed from the first area 51 side. The connecting board 3 having the terminal part 31 to which the cathode terminal 21 and the anode terminal 22 are connected is fitted to the frame 4.

Figure 7:
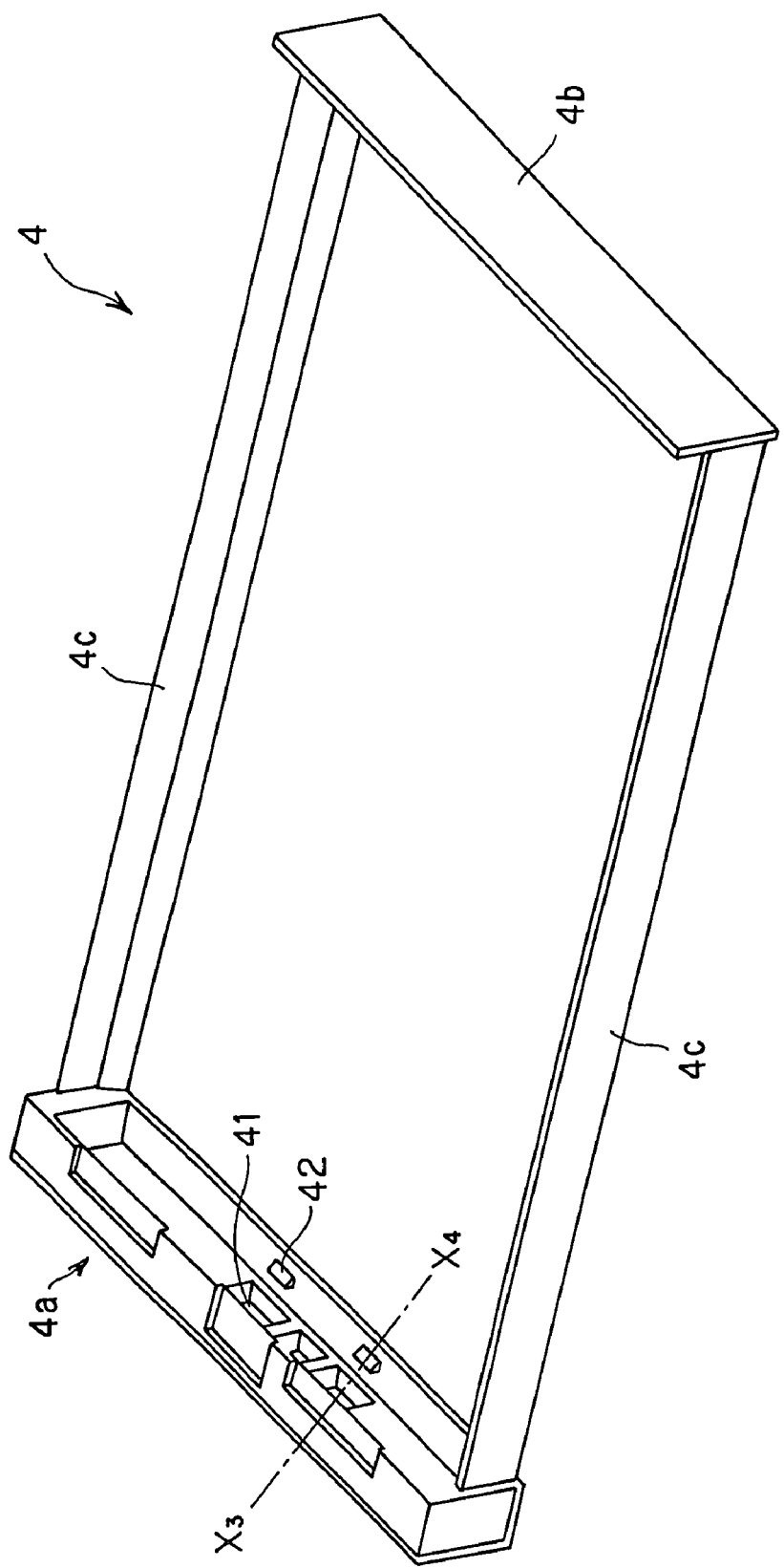
FIG. 7 is a perspective view showing the structure of the frame.

The frame 4 is a frame member having a size corresponding to the outer form of the battery element 2 as shown in FIGS. 6 and 7. The frame 4 comprises a front wall part 4a disposed in the terminal side of the battery element 2, a rear wall part 4b disposed in a side opposite to the terminals of the battery element 2 and side wall parts 4c disposed in the side surface parts of the battery element 2. The frame 4 is arranged in the periphery of the battery element 2 to protect the battery element 2 from an impact due to, for instance, falling. The frame 4 may be formed with various kinds of plastic materials. Especially, the same material of the uniting surface of the package body 5 as polypropylene, that is, polypropylene or a material having the same melting point as that of polypropylene are preferably exemplified.

As described above, the battery element 2 has a substantially trapezoidal shape in section under a reduced pressure. As shown in FIG. 9, the side wall parts 4c of the frame 4 are arranged in space parts formed in the peripheral edge parts of the second surface side of the battery element 2. Thus, a dead space can be effectively utilized to more improve volume efficiency.

The parts of the side walls 4c opposed to the battery element 2 are preferably formed in R shapes. Thus, the strength and impact resistance of the frame 4 can be increased.

In the front wall part 4a of the frame 4 corresponding to the terminal side of the battery element 2, the connecting board 3 is disposed and an opening part 41 is formed. The opening part 41 allows the terminal part 31 of the connecting board 3 to face outside. The connecting board 3 is disposed in the frame 4 while the terminal part 31 faces outside from the opening part 41. The terminal part 31 facing outside from the opening part 41 is electrically connected to the external device. In this example, three opening parts 41 are provided. These opening parts 41 can be used for, for instance, the cathode terminal, the anode terminal and other information terminal. However, the use of the openings is not limited thereto.

Further, in the frame 4, engaging members 42 having substantially triangular forms in section are disposed and the connecting board 3 is engaged with the engaging members 42 to be arranged in the frame 4.

Figure 8:
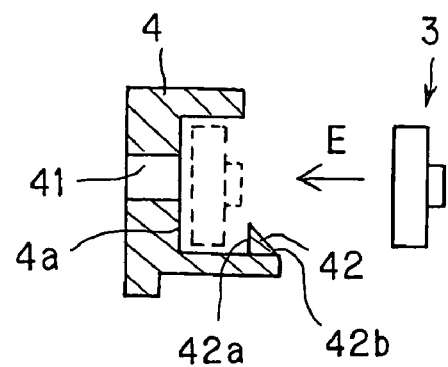
FIG. 8 is a sectional view taken along a line $X_3$-$X_4$ in FIG. 7.

An enlarged view of the engaging part is shown in FIG. 8. The engaging member 42 has a substantially right-angled triangle form including a substantially vertical surface 42a in the front wall surface side 4a and an inclined surface 42b inclined toward an opening side. When the connecting board 3 is disposed in the frame 4, the connecting board 3 is pushed in the direction shown by an arrow mark E in FIG. 8 to get over the inclined surface 42b of the engaging member 42. Thus, the connecting board 3 is arranged between the front wall part 4a of the frame 4 and the vertical surface 42a of the engaging member 42. When the connecting board 3 is detached from the frame 4, the connecting board 3 needs to get over the vertical surface 42a of the engaging member 42 so that the connecting board 3 can be prevented from falling.

Further, in case a connecting terminal from the external device is connected to the terminal part 31 of the connecting board 3, when force is externally exerted on the connecting board, for instance, when the connecting terminal is pushed through the opening part 41, the connecting board 3 is prevented from falling by the engaging member 42. Thus, the connecting board 3 can maintain a state that the connecting board 3 is engaged with the frame 4 and the terminals can be more assuredly connected.

As described above, the frame 4 is disposed in the periphery of the battery element 2. Thus, even when the battery element 2 is not accommodated in a plastic case, the mechanical strength and the reliability of the terminals equal to those when the plastic case is used can be maintained.

Then, as shown in an arrow mark D in FIGS. 6 and 9, a third area 53 is bent to the second area 52 in a bending line 5b. Thus, a surface opposite to the side of the first area 51 for accommodating the battery element 2 which is united to the second area 52, that is, the second surface side of the battery element 2 is covered with the third area 53.

Finally, the third area 53 is united to the first area 51. The uniting is carried out by opposing the polypropylene layer sides of the third area 53 and the first area 51 to each other and heat-sealing them at about 170° C.

Thus, the battery element 2 is accommodated and sealed in the package body 5, and further, the connecting board 3 and the frame 4 are packed by the package body 5. Thus, the battery pack 1 as shown in FIGS. 2 and 3 is completed.

In the battery pack 1 obtained in such a manner, the laminate material of the battery element is used also as a pack outer package material. Accordingly, volume efficiency can be improved more by 10% or higher than that obtained when the plastic case is used as an outer package material. Thus, the volume density of the battery pack 1 can be improved.

Further, the frame is disposed in the periphery of the battery element, the same mechanical strength and reliability of the terminals as those when the plastic case is employed can be maintained to realize a high reliability.

The laminate material of the battery element is shared with the package body of the battery pack so that a design can be simplified, the battery element and the battery pack can be consistently produced and a process cost can be reduced. Further, a production time can be shortened to improve productivity.

Further, parts such as a case, a tape, a label, etc, necessary when the plastic case is used are not necessary. Thus, the number of parts can be reduced and a material cost can be reduced.

Second Embodiment

Figure 10:
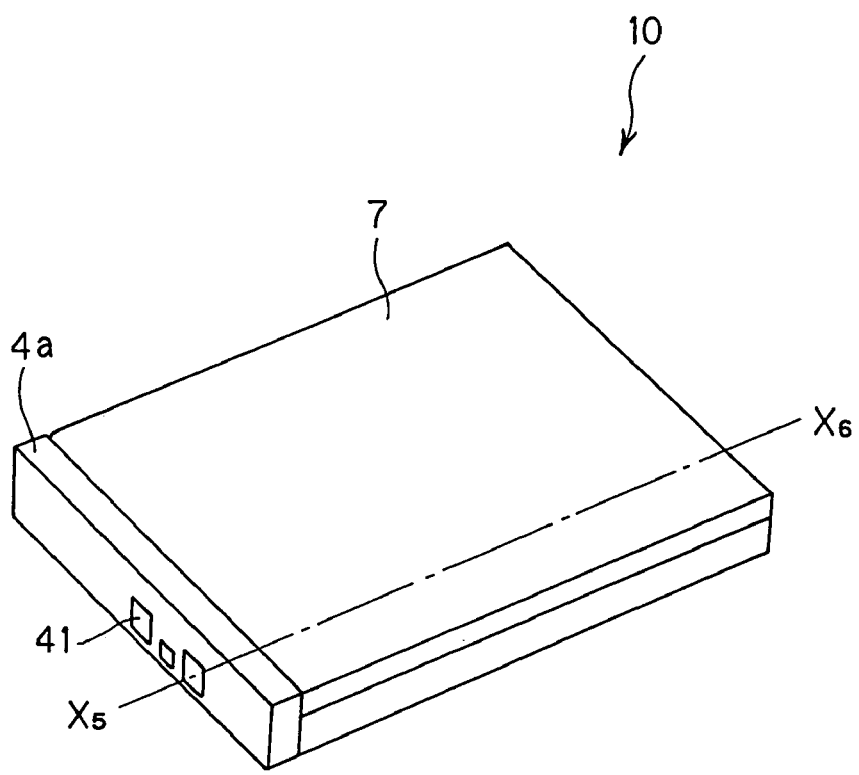
FIG. 10 is a perspective view showing one structural example of a battery pack to which the present invention is applied.
Figure 11:
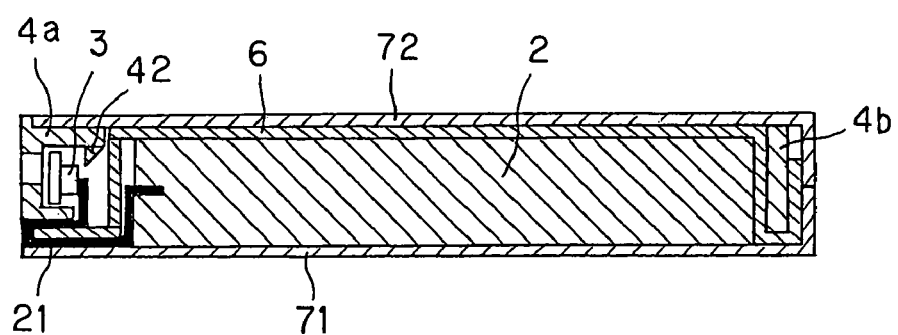
FIG. 11 is a sectional view taken along a line $X_5$-$X_6$ in FIG. 10.

FIG. 10 is a perspective view showing one structural example of a battery pack 10 to which the present invention is applied. FIG. 11 is a sectional view taken along a line $X_5$-$X_6$ in FIG. 10. FIGS. 12 to 18 are diagrams for explaining a method for producing the battery pack 10.

The battery pack 10 comprises a battery element 2, a connecting board 3, a frame 4 and a package body. The battery element 2 is accommodated and sealed in the package body and further packed together with the connecting board 3 and the frame 4 by the package body.

The battery element, the connecting board and the frame have substantially the same structures as those of the battery element 2, the connecting board 3 and the frame 4 of the battery pack 1 in the above-described first embodiment. Accordingly, these members are designated by the same reference numerals in the drawings and the detailed description thereof is omitted here.

The package body for accommodating and packing the battery element 2 is composed of two package bodies including a first package body 6 and a second package body 7.

Figure 12:
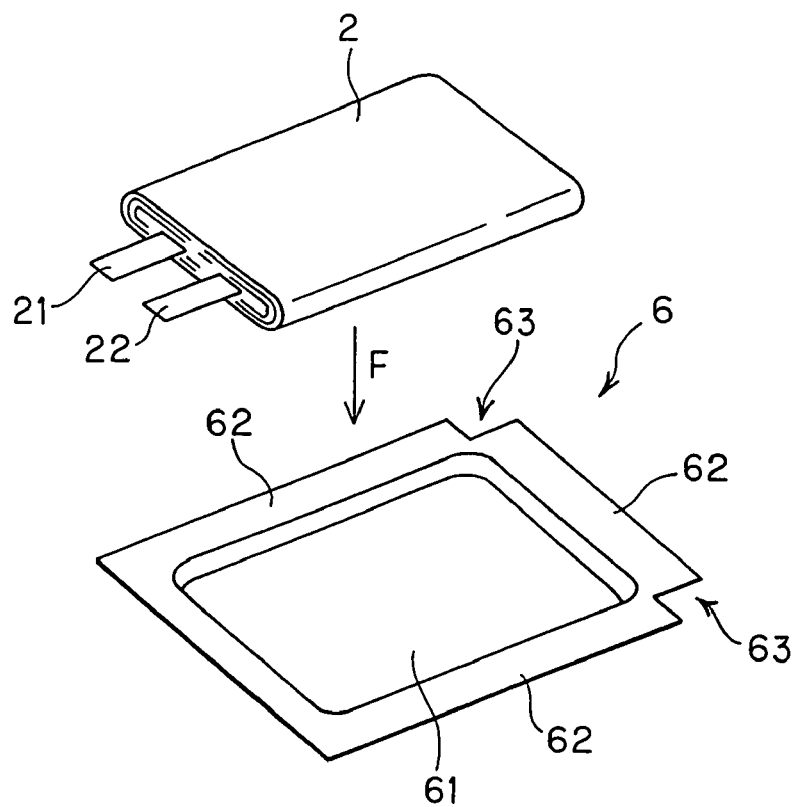
FIG. 12 is a perspective view showing a state in which a battery element is housed in a housing recessed part.
Figure 13:
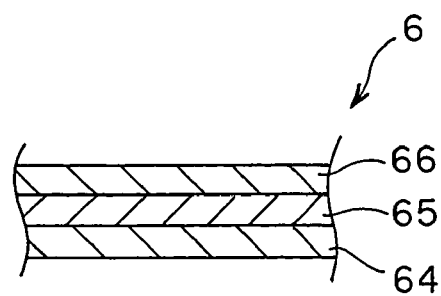
FIG. 13 is a sectional view showing the laminated structure of a package body.

The first package body 6 has a substantially rectangular form and a housing recessed part 61 in which the battery element 2 is accommodated is previously formed, as shown in FIG. 12. In the periphery of the housing recessed part 61, a uniting piece 62 is provided. In one end part in the longitudinal direction, cut-out parts 63 are formed at both ends in the direction of a short side. The first package body 6 has, as shown in FIG. 13, a laminated structure in which a polypropylene (PP) layer 64, an aluminum (Al) layer 65 and a nylon layer (Ny) 66 are laminated in order from inside. The polypropylene layer 64 serves as a uniting surface.

Figure 14:
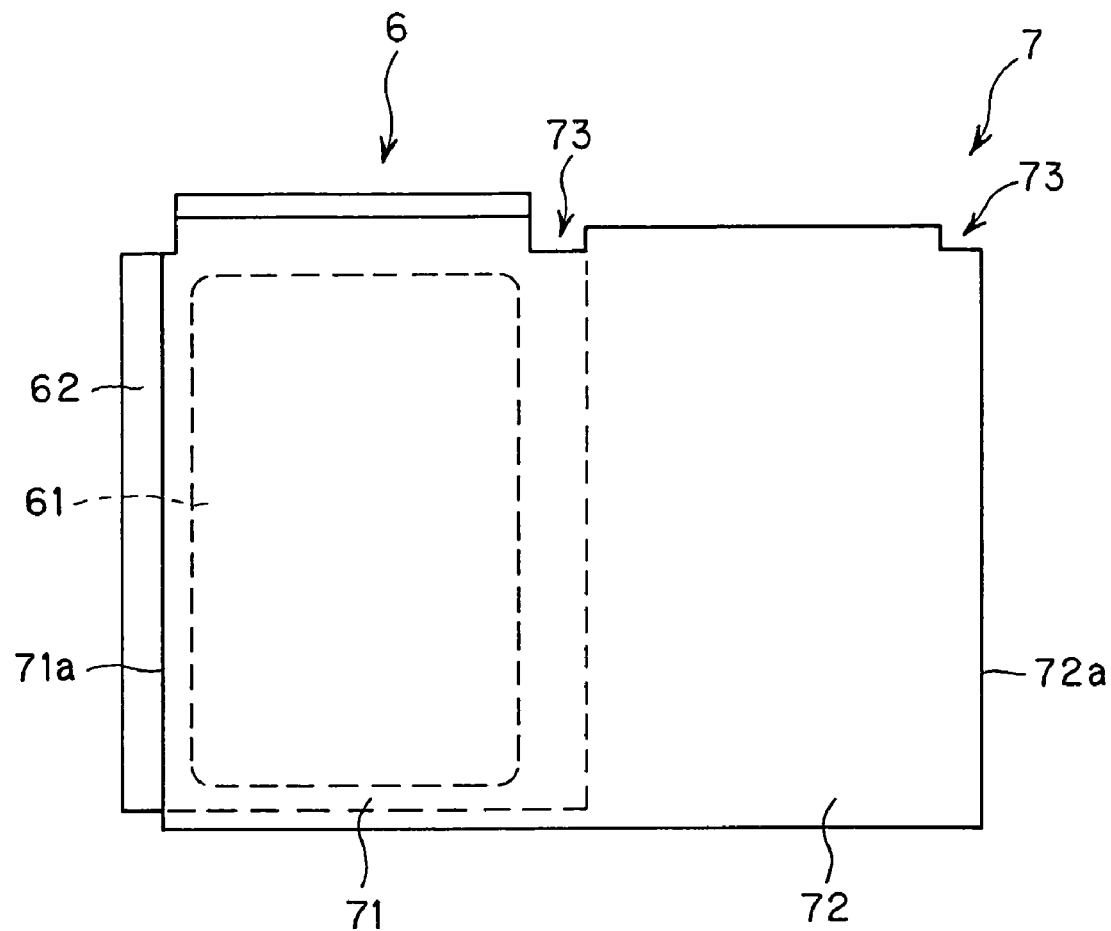
FIG. 14 is a plan view showing a state that a second package body is superposed on a first package body.

The second package body 7 includes, as shown in FIG. 14, at least a first area 71 with a substantially rectangular form and a second area 72 with a substantially rectangular form continuous to the direction of a short side of the first area 71. Here, the first area 71 serves as an area with which a first surface of the battery element 2 housed in the housing recessed part 61 of the first package body 6 which is exposed outside is covered. The second area 72 serves as an area with which a second surface side of the battery element 2 is covered together with the first package body 6. Further, in the second package body 7, cut-out parts 73 are similarly formed in parts corresponding to the cut-out parts 63 formed in the first package body 6.

The second package body 7 is made of a material harder than that of the first package body 6. As a material of the second package body 7, an aluminum thin plate having a polypropylene layer formed in an inner surface or the like may be exemplified. The hard material is used for the second package body 7 as an outer package body to assure a strength and obtain an excellent impact resistance.

The structures of the first package body 6 and the second package body 7 are not limited to the above-described structures and a laminate film having various kinds of materials and laminated structures may be employed. Further, a uniting method thereof is not limited to a heat sealing method.

In the present invention, the package body for sealing the battery element 2 is also used as an outer package material of the battery pack 10 so that a plastic case is not required to improve volume efficiency.

Firstly, as shown by an arrow mark F in FIG. 12, the battery element 2 is accommodated in the housing recessed part 61 that is provided in the first package body 6. At this time, the terminal side of the battery element 2 is disposed so as to be opposite to a side in which the cut-out parts 63 are formed.

Then, as shown in FIG. 14, the second package body 7 is superposed on the first package body 6 having the housing recessed part 61 in which the battery element 2 is housed. Thus, the first surface of the battery element 2 housed in the housing recessed part 61 which is exposed outside is covered with the first area 71 of the second package body 7.

At this time, as shown in FIG. 14, the second package body 7 is arranged to be shifted inside an outer line of the uniting piece 62 of the first package body 6.

Then, the first package body 6 is united to the first area 71 of the second package body 7. When the first package body 6 is united to the first area 71 of the second package body 7, the polypropylene surfaces of the first package body 6 and the first area 71 of the second package body 7 are opposed to each other in the four sides of the periphery of the battery element 2 housed in the housing recessed part 61 and heat-sealed at about 170° C.

Figure 16:
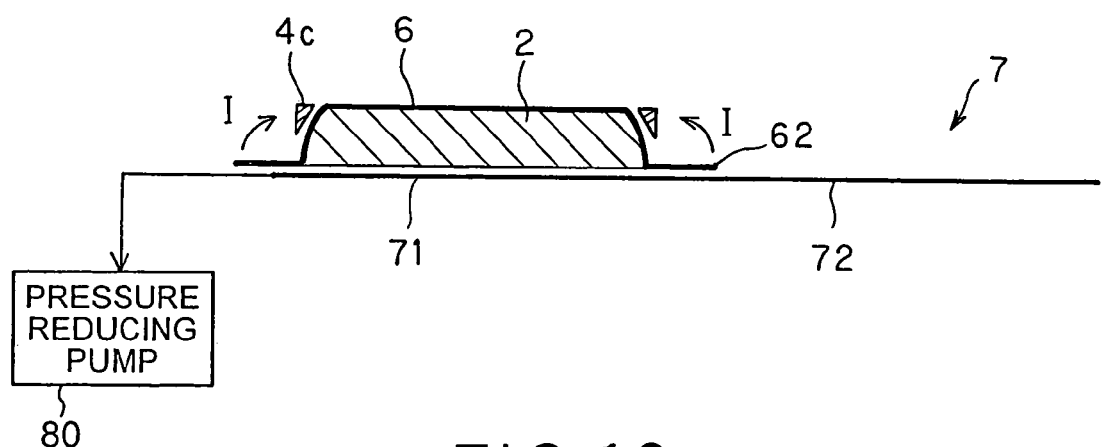
FIG. 16 is a sectional view showing a state that the frame has been disposed in the periphery of the housed battery element.

At this time, as shown in FIG. 16, a pressure reducing pump 80 is used to reduce pressure as well as a uniting. Thus, the battery element 2 is covered with and sealed by the first package body 6 and the first area 71 of the second package body 7. At this time, a cathode terminal 21 and an anode terminal 22 of the battery element 2 are sandwiched in between the uniting surfaces of the first package body 6 and the first area 71 of the second package body 7 to be exposed outside the package body.

Here, the pressure is reduced to suck the first package body 6. Thus, as shown in FIG. 16, the battery element 2 accommodated in the housing recessed part 61 is drawn to have a substantially trapezoidal form in which the second surface side as the bottom surface side of the housing recessed part 61 is small and the first surface side as an opening side is large.

Subsequently, the cathode terminal 21 and the anode terminal 22 are connected to a terminal part 31 of the connecting board 3. Then, as shown by an arrow mark G in FIG. 15, in the periphery of the battery element 2 accommodated in the housing recessed part 61 of the first package body 6 and covered and sealed with the first area 71 of the second package body 7, the frame 4 is disposed from the first package body 6 side. The connecting board 3 having the terminal part 31 to which the cathode terminal 21 and the anode terminal 22 are connected is fitted to the frame 4.

The frame 4 is disposed in the periphery of the battery element 2, so that even when the battery element 2 is not disposed in a plastic case, the same mechanical strength and reliability of the terminals as those when the plastic case is used can be ensured.

As described above, the battery element 2 has a substantially trapezoidal shape in section under a reduced pressure. As shown in FIG. 16, the side surface walls of the frame 4 are arranged in space parts formed in the peripheral edge parts of the second surface side of the battery element 2. Thus, a dead space can be effectively utilized to more improve volume efficiency.

Figure 15:
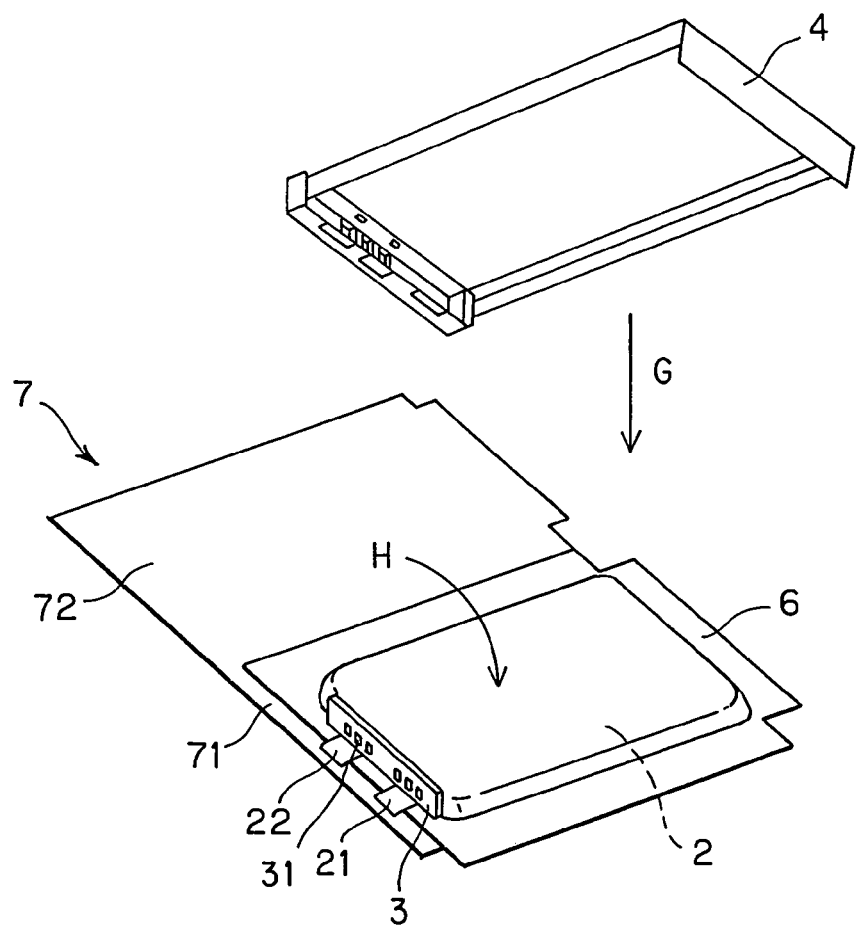
FIG. 15 is a perspective view showing a state that a frame is disposed in the periphery of the housed battery element.
Figure 17:
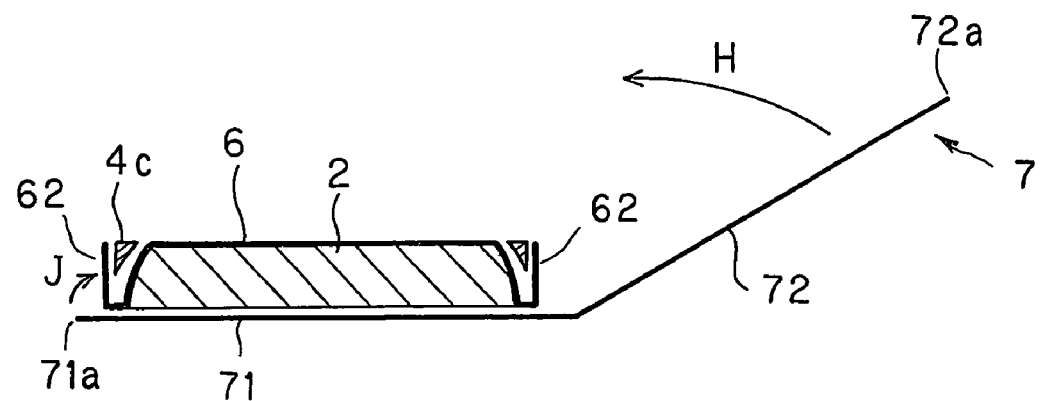
FIG. 17 is a sectional view showing a state that the periphery of the battery element is covered with a second package body.

Then, as shown in an arrow mark H in FIGS. 15 and 17, the second area 72 of the second package body 2 is bent relative to the first area 71 in a bending in a bending line. Thus, the second surface side opposed to the first surface of the battery element 2 accommodated in the housing recessed part 61 of the first package body 6 and covered with the first area 71 of the second package body 7 is covered with the second area 72.

At this time, the uniting piece 62 of the first package body 6 is bent as shown by an arrow mark I in FIG. 16 and arranged along the frame 4 disposed in the periphery of the battery element 2.

Finally, the first package body 6 is opposed and united to the second package body 7.

At this time, the second package body 7 is superposed on the first package body 6 under a state that the second package body 7 is shifted from the first package body 6. As shown in FIGS. 14 and 16, an end part 71a in the first area 71 side of the second package body 7 is located inside the uniting piece 62 of the first package body 6.

Figure 18:
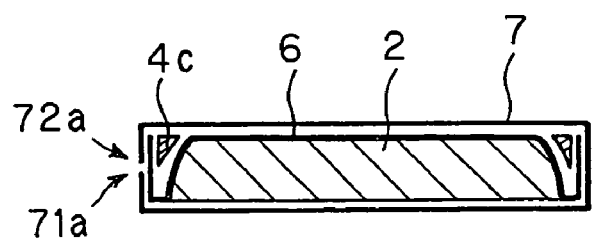
FIG. 18 is a sectional view showing a state that the periphery of the battery element has been covered with the second package body.

Accordingly, as shown in FIGS. 17 and 18, the uniting piece 62 disposed along the frame 4 protrudes from the first area 71 of the second package body 7 disposed along the frame 4 as shown by an arrow mark J. The protruding surface of the uniting piece 62 is opposed and united to a surface located inside when the first package body 6 is covered with the second area 72. That is, these surfaces are the surfaces of the polypropylene layers of the first package body 6 and the second package body 7, and united to each other by opposing and heat-sealing them at about 170° C.

Further, as shown in FIG. 18, in the second package body 7, the end part 71a of the first area 71 side is butted against and united to the end part 72a of the second area 72 side.

Further, also in the rear end side of the frame 4, the protruding surface of the uniting piece 62 is opposed and united to a surface located inside when the first package body 6 is covered with the second area 72 in the same manner as described above.

Thus, the battery element 2 is accommodated and sealed in the package body including the first package body 6 and the second package body 7, and further, the connecting board 3 and the frame 4 are packed by the package body. Thus, the battery pack 10 as shown in FIGS. 10 and 11 is completed.

In the battery pack 10 obtained in such a manner, the laminate material of the battery element is used also as the outer package material of the pack. Accordingly, volume efficiency can be improved more by 10% or higher than that obtained when the plastic case is used as an outer package material. Thus, the volume density of the battery pack 10 can be improved.

Further, the frame is disposed in the periphery of the battery element, the same mechanical strength and reliability of the terminals as those when the plastic case is employed can be maintained to realize a high reliability.

The laminate material of the battery element is shared with the package body of the battery pack so that a design can be simplified, the battery element and the battery pack can be consistently produced and a process cost can be reduced. Further, a production time can be shortened to improve productivity.

Further, parts such as a case, a tape, a label, etc, necessary when the plastic case is used are not necessary. Thus, the number of parts can be reduced and a material cost can be reduced.

Third Embodiment

Figure 19:
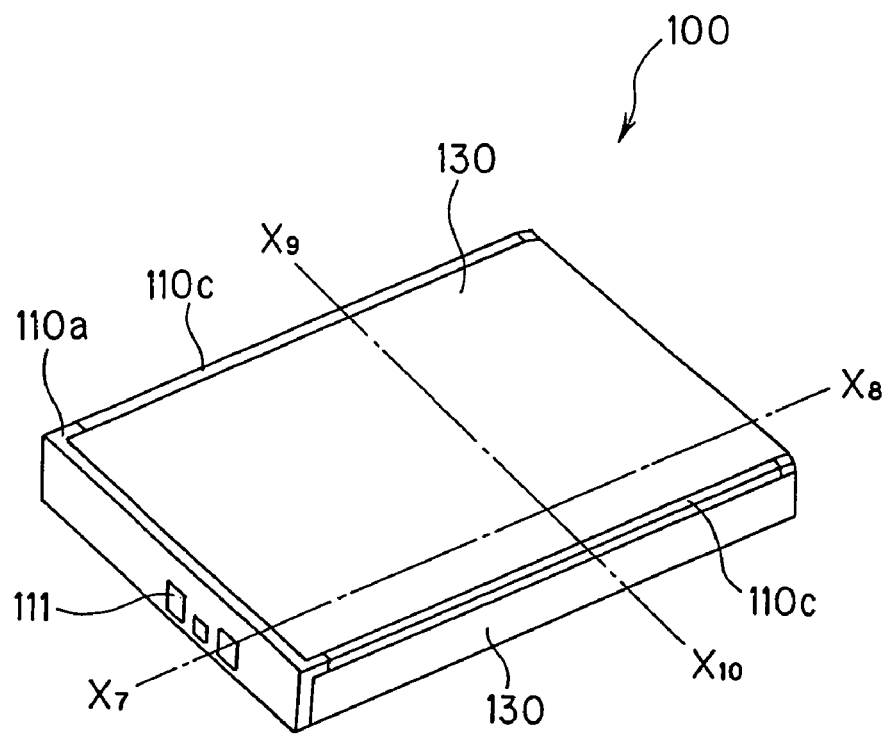
FIG. 19 is a perspective view showing one structural example of a battery pack to which the present invention is applied.
Figure 20:
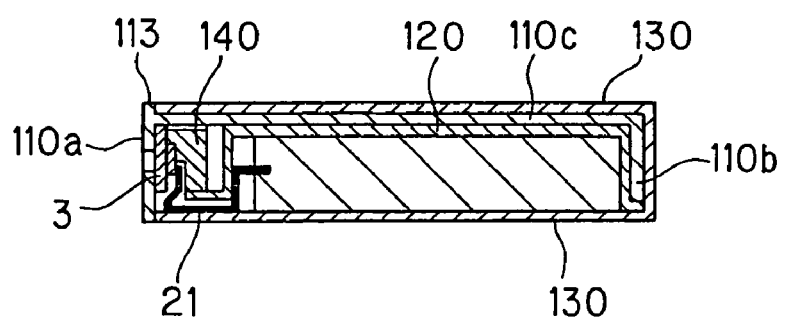
FIG. 20 is a sectional view taken along a line $X_7$-$X_8$ in FIG. 19.

Now, a battery pack shown in FIGS. 19 and 20 will be described below. In this battery pack, materials of a package body are different from those of the above-described battery packs 1 and 10.

The battery pack 100 comprises a battery element 2, a connecting board 3, a frame 110 disposed in the periphery of the battery element 2, a first package body 120 for packing an inner part of the pack, a second package body 130 for packing an outer part of the pack and a fixing member 140 for fixing the connecting board 3. In the battery pack 100, the connecting board 3 and the frame 110 are disposed in the periphery of the battery element 2 packed by the first package body 120 and the second package body 130 to unite the frame 110 to the second package body 130. Thus, the second package body 130 serves also as an outer package material of the pack.

Since the battery element 2 and the connecting board 3 have the substantially same structures as those of the battery pack 1 according to the above-described first embodiment, these members are designated by the same reference numerals in the drawings and the detailed description thereof will be omitted.

Figure 21:
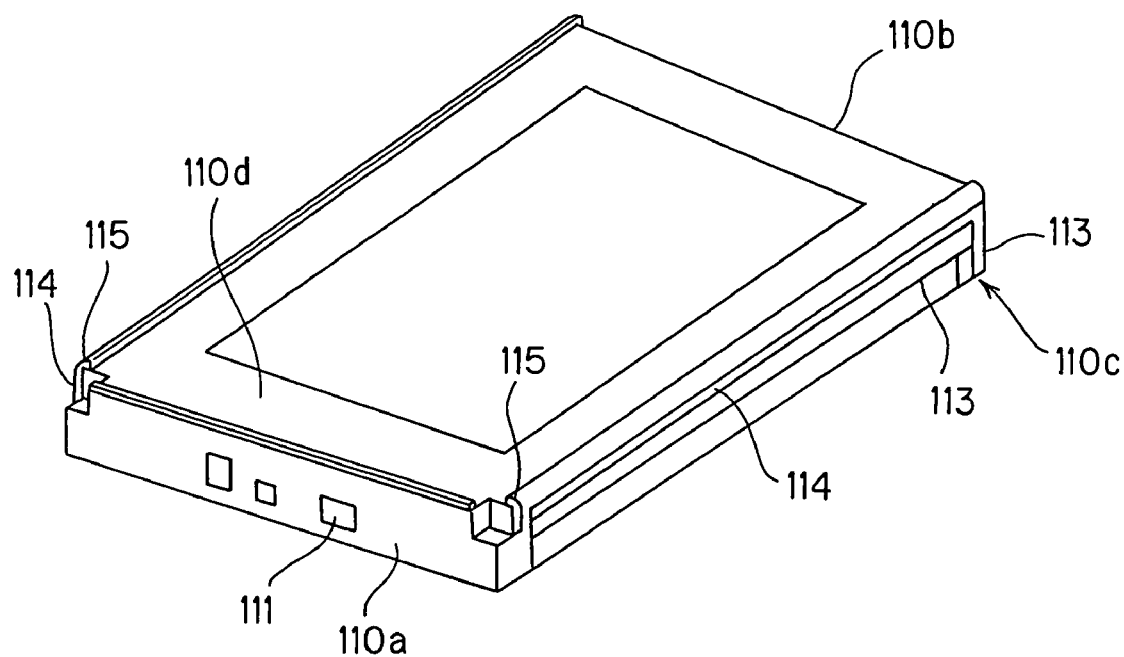
FIG. 21 is a perspective view showing the structure of a frame.

The frame 110 is a frame type member with a size adapted to the outer form of the battery element 2. The frame 110 includes, as shown in FIG. 21, a front wall part 110*a* disposed in the terminal side of the battery element 2, a rear wall part 110*b* disposed in a side opposite to the terminals of the battery element 2, side wall parts 110*c* disposed on the side surface parts of the battery element 2 and an upper wall part 110*d*. The front wall part 110*a* includes opening parts 111 for exposing a terminal part 31 provided in the connecting board 3 when the connecting board 3 is arranged and an engaging recessed part 112 engaging with the below-described fixing member 140. Here, an example that three opening parts 111 are provided is shown. These opening parts 111 can be used for, for instance, a cathode terminal 21, an anode terminal 22 and other information terminal. However, the opening parts are not limited thereto. Further, the engaging recessed part 112 is formed in an inner surface of the front wall part 110*a* and engaged with the below-described fixing member 140.

Figure 22:
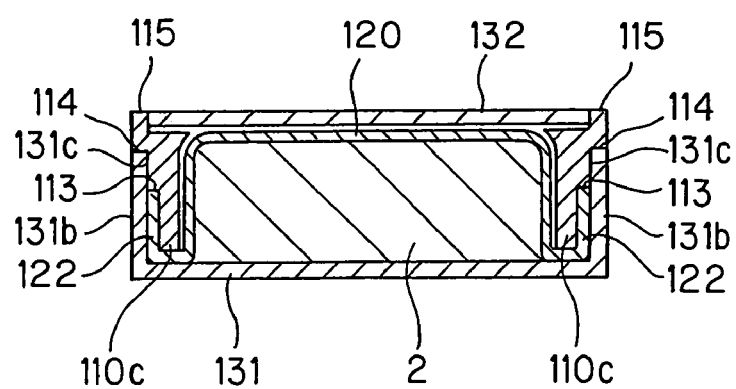
FIG. 22 is a sectional view taken along a line $X_9$-$X_{10}$ in FIG. 19.

Further, as shown in FIGS. 21 and 22, in the lower end sides of the side wall parts 110*c* of the frame 110, first step parts 113 with which the end parts of the uniting piece 122 of the first package body 120 are engaged are provided. In the upper parts of the first step parts 113, second step parts 114 with which the end parts of the uniting part 131*b* of the second package body 130 are engaged are provided. In the upper side end face of the frame 110, third step parts 115 with which the end parts of the second area 132 of the second package body 130 are engaged are provided.

The first step part 113 is specifically formed by a cut-out part provided in a corner formed by the outer surface and the bottom surface of the side wall part 110*c*. The cut-out part is formed toward the inside of the frame 110 with the substantially same width as the thickness of the first package body 120 engaged therewith. Further, the first, step part 113 may be formed by providing a cut-out part toward the inside of the frame 110 with a smaller width than the thickness of the first package body 120. In this case, the width of the first step part 113 is formed so as not to expose a below-described aluminum layer 124 of the first package body 120.

In the second step part 114, a cut-out part is provided to be continuous to the first step part 113. The cut-out part is formed toward the inside of the frame 110 with the substantially same width of the thickness of the second package body 130 engaged therewith. Further, the second step part 114 may be formed by providing a cut-out part toward the inside of the frame 110 with a smaller width than the thickness of the second package body 130.

Each third step part 115 is opened and provided in an inside corner part on an upper end. The third step part 115 is formed toward the outer part of the frame 110 with the substantially same width as the thickness of the second package body 130 engaged therewith. Further, the third step part 115 may be formed by providing a step part toward the outside of the frame 110 with a smaller width than the thickness of the second package body 130.

When the second step part 114 and the third step part 115 are formed with the width smaller than the width of the second package body 130, they are formed with such a width as not to expose outside a below-described aluminum layer 134 of the second package body 130.

In the first step parts 113 and the second step parts 114, the end parts of the uniting piece 122 of the first package body 120 are engaged with the first step parts 113. The end parts of the uniting part 131*b* of the second package body 130 are engaged with the second step parts 114 above the first step parts 113. Thus, the end parts of the uniting piece 122 of the first package body 120 are shifted from the end parts of the uniting part 131*b* of the second package body 130 on the side walls. Accordingly, conductive metal layers respectively forming the end parts can be prevented from coming into contact with each other to generate a short-circuit.

Further, since the end parts of the second area 132 of the second package body 130 engaged with the third step parts 115 are separated from the end parts of the first area 131 of the second package body 130 engaged with the second step parts 114, a short-circuit between the end parts of the second area 132 of the second package body 130 and the end parts of the first area 131 of the second package body 130 is prevented.

Further, since the first step parts 113 to the third step parts 115 are provided in the frame 110, the end parts of the first package body 120 and the end parts of the second package body 130 do not protrude outside. Accordingly, the battery pack 100 is prevented from externally giving a damage due to the end parts of the package bodies.

Further, the frame 110 is disposed in the periphery of the battery element 2, so that the battery element 2 can be protected from the impact of, for instance, falling or the like. The frame 110 may be made of various kinds of plastic materials. Specially, a material having the same quality as that of polypropylene used for the package body, that is, polypropylene or a material having the same melting point as that of polypropylene may be preferably exemplified in view of the uniting to the package body.

Figure 23:
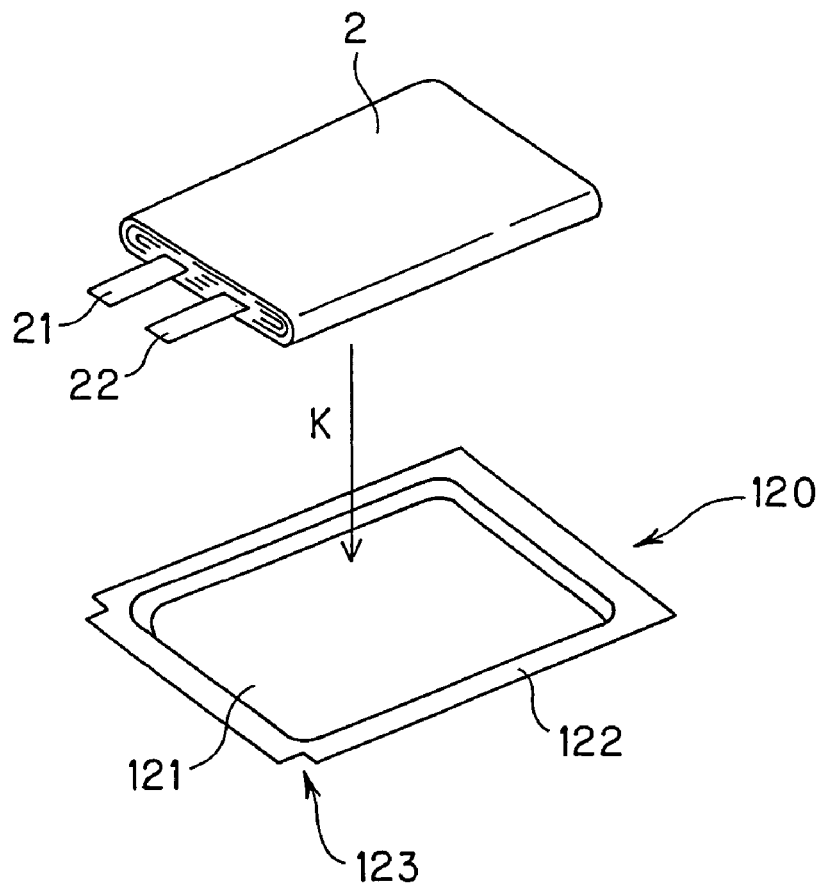
FIG. 23 is a perspective view showing a state that a battery element is housed in a housing recessed part.

The first package body 120 has, as shown in FIG. 23, a substantially rectangular form and a housing recessed part 121 previously formed in which the battery element 2 is accommodated. In the periphery of the housing recessed part 121, the uniting piece 122 to be united to the below-described second package body 130 is provided. In one short side of the first package body 120, cut-out parts 123 are provided.

Figure 24:
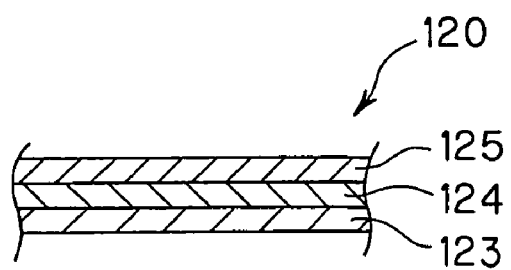
FIG. 24 is a sectional view showing the laminated structure of a first package body.

The first package body 120 has, as shown in FIG. 24, a laminated structure in which a polypropylene (PP) layer 123, an aluminum (Al) layer 124 and a nylon layer (Ny) 125 are laminated in order from inside. The polypropylene layer 123 serves as a uniting surface when the first package body 120 is united to the second package body 130. The aluminum layer 124 serves to maintain the air-tightness of the battery pack 100. The nylon layer 125 has such a strength as to withstand an external impact such as piercing and maintains an insulation between the outer part of the pack and the aluminum layer 124.

Figure 25:
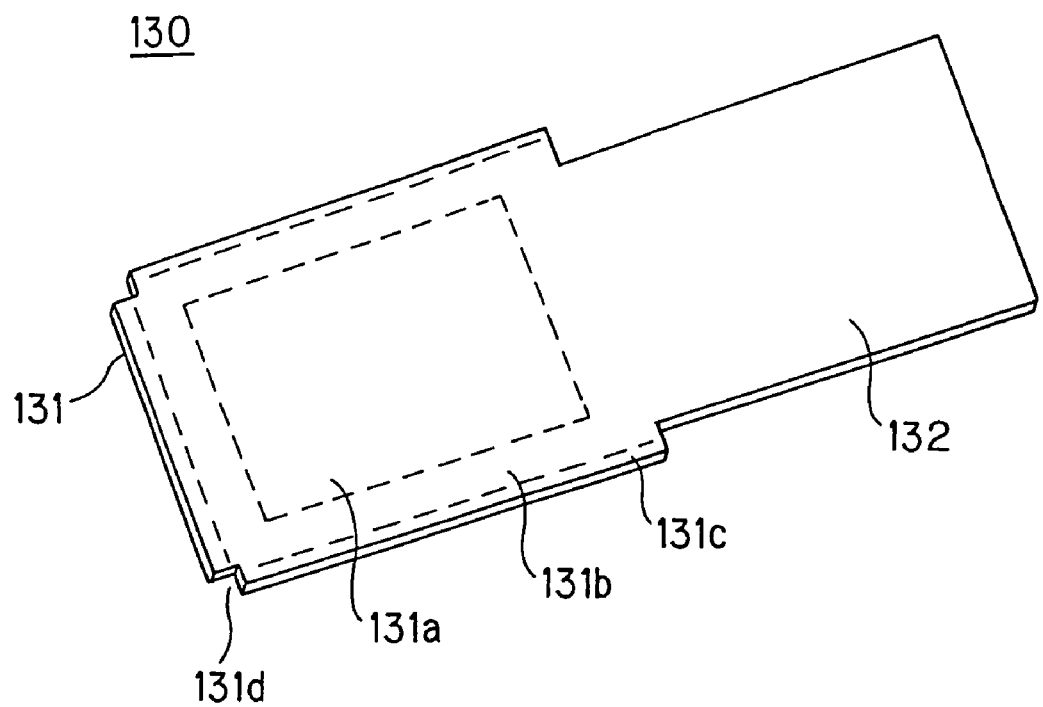
FIG. 25 is a perspective view of a second package body.
Figure 26:
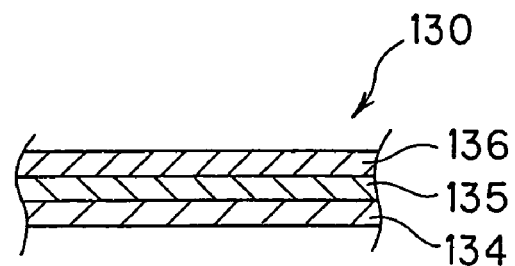
FIG. 26 is a sectional view showing the laminated structure of a second package body.

The second package body 130 includes, as shown in FIG. 25, the first area 131 formed in a substantially rectangular shape and the second area 132 with a substantially rectangular form provided continuously to one short side of the first area 131.

The first area 131 includes a cover part 131a with which a first surface of the battery element 2 housed in the housing recessed part 121 of the first package body 120 which is exposed outside is covered and the uniting part 131b united to the uniting piece 122 of the first package body 120.

The cover part 131a has the substantially same area as that of the first surface of the battery element 2. The uniting part 131b is formed to be larger than the uniting piece 122 of the first package body 120 both in the directions of a long side and a short side. The parts of the uniting part 131b larger than the uniting piece 122 of the first package body 120 serve as margin parts 131c to be united to the side wall parts 110c of the frame 110. In the margin parts 131c, below-described polypropylene layers 133 are exposed to the first package body 120 side.

Thus, in the first area 131, the cover part 131a with which the first surface of the battery element 2 is covered forms one main surface of the battery pack 100. The uniting part of the uniting piece 122 of the first package body 120 located in the long side of the battery element 2 and the uniting part 131b of the first area 131 forms a side surface of the long side of the battery pack 100 by uniting the side wall parts 110c of the frame 110 to the margin parts 131c of the first area 131. In the first area 131, at both the ends of a short side opposite to a short side to which the second area 132 is united, cutout parts 131d are formed.

The second area 132 is formed in a substantially rectangular shape and provided continuously to one short side of the second package body 130. The second area 132 covers an end part opposite to an end part from which the terminal part of the battery element 2 is drawn and the housing recessed part 121 of the first package body 120. Accordingly, the second area 132 forms the side surface of the end part opposite to the end part in which the opening parts 111 of the frame 110 of the battery pack 100 are provided and the other main surface of the battery pack 100.

The second package body 130 is formed by laminating a resin layer made of a resin material and a metal layer made of metal and is a laminate film having a laminated structure in which a polypropylene (PP) layer 133 as the resin layer, an aluminum (Al) layer 134 as the metal layer on the polypropylene layer 133 and a nylon layer (Ny) 135 as the resin layer on the aluminum layer 134 are laminated. The polypropylene layer 133 serves as a uniting surface when the first package body 120 is united to the second package body 130.

The aluminum layer 134 serves to maintain the air-tightness of the battery pack 100. The aluminum layer 134 employs a harder aluminum material than that of the aluminum layer 124 used for the first package body 120. As such aluminum, there is, for instance, 3004H-H18 (Japanese Industrial Standards: JIS H4160) material or the like. Further, as the metal layer, a layer using a material such as stainless steel, copper (Cu), nickel (Ni), iron (Fe), etc. may be provided as well as the aluminum layer 134. Here, the Vickers hardness of the aluminum layer 134 is 50 Hv or higher and 100 Hv or lower.

The nylon layer 135 as the resin layer has such a strength as to withstand an external impact such as piercing and maintains an insulation between the outer part of the pack and the aluminum layer 134. Further, as the resin layer, a polyethylene terephthalate (PET) layer or a polyethylene naphthalate (PEN) layer using materials such as polyethylene terephthalate (PET) or polyethylene naphthalate (PEN), etc. may be employed as well as the nylon layer 135.

Since the thickness of the polypropylene layer 133 is about 20 μm, the thickness of the aluminum layer 134 is about 100 μm, and the thickness of the nylon layer 135 is about 30 μm, respectively, the total thickness of the second package body 130 is about 150 μm.

Figure 29:
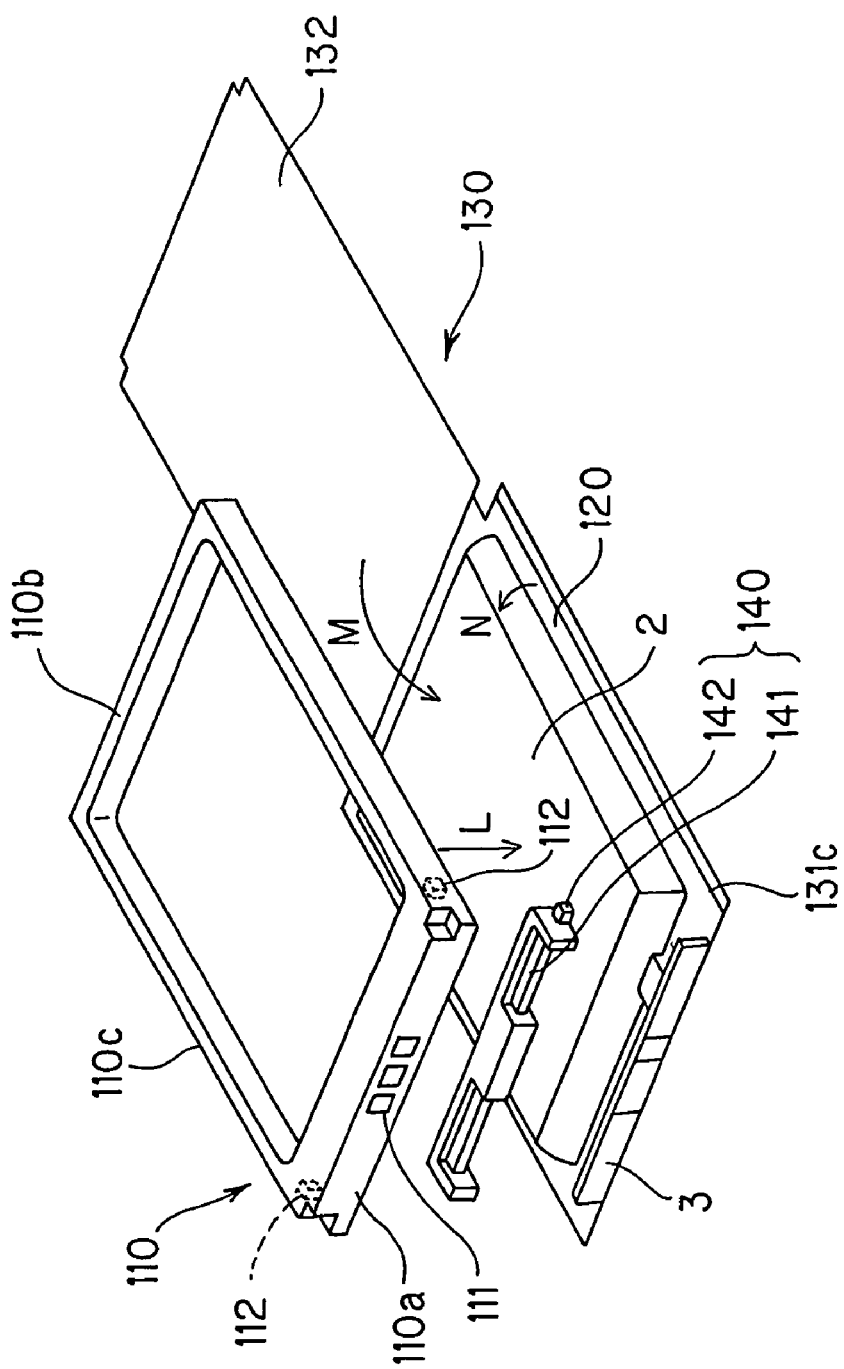
FIG. 29 is an exploded perspective view showing a state that the frame and a fixing member are arranged in the periphery of the housed battery element.

The fixing member 140 comprises, as shown in FIG. 29, support parts 141 for supporting the connecting board 3 and engaging protrusions 142 provided at both outer ends of the support parts 141 and engaged with the front wall part 110a of the frame 110. The support parts 141 are formed in substantially U shapes to hold and support both the ends of the connecting board 3 between them. When the engaging protrusions 142 are disposed in the frame 110, the engaging protrusions are engaged with the engaging recessed parts 112 provided in the front wall part 110a of the frame 110 and fixed in the frame 110. Accordingly, the fixing member 140 is disposed in the frame 110 together with the connecting board 3 to assuredly fix the connecting board 3 by the support members 141 and the engaging protrusions 142. Further, when the thickness of the connecting board 3 is small, for instance, when the connecting board 3 whose thickness is 4.0 mm or less is used, the fixing member 140 is especially effective.

Now, a method for producing the battery pack 100 having the above-described structure will be described below. Firstly, as shown by an arrow mark K in FIG. 23, the battery element 2 is accommodated in the housing recessed part 121 of the first package body 120. At this time, the terminal part of the battery element 2 is drawn to the short side of the first package body 120.

Figure 27:
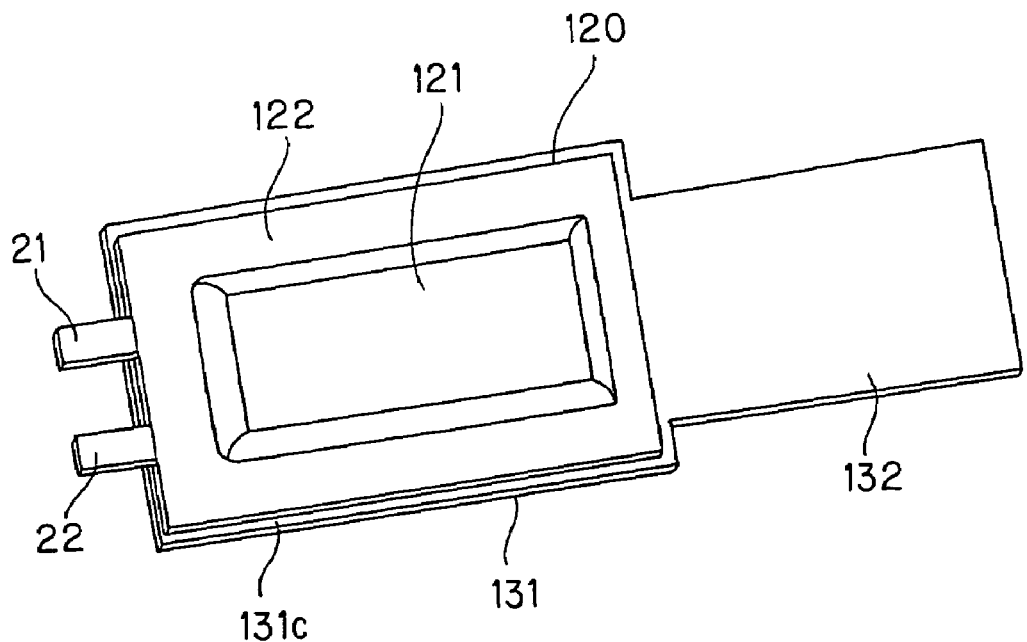
FIG. 27 is a perspective view showing a state that the second package body is superposed on the first package body.

Then, as shown in FIG. 27, the first area 131 of the second package body 130 is superposed on the first package body 120 from a side in which the battery element 2 is exposed so that the polypropylene layer 133 of the second package body 130 is located in the first package body 120 side. Thus, the first surface of the battery element 2 housed in the housing recessed part 121 of the first package body 120 which is exposed outside is covered with the first area 131 of the second package body 130. At this time, the second package body 130 is superposed on the first package body 120 so that the second area 132 of the second package body 130 is located in a short side opposite to the short side from which the terminal part of the battery element 2 is drawn. Under this state, the polypropylene layers 133 of the margin parts 131c provided in the first area 131 of the second package body 130 are exposed to the first package body 120 side.

Then, the first package body 120 is united to the first area 131 of the second package body 130. When the first package body 120 is united to the first area 131 of the second package body 130, the polypropylene layer 123 of the uniting piece 122 of the first package body 120 is united to the polypropylene layer 133 of the uniting part 131b of the first area 131 of the second package body 130 by heat-sealing them at about 170° C. in the four sides of the periphery of the battery element 2 housed in the housing recessed part 121 of the first package body 120.

Figure 28:
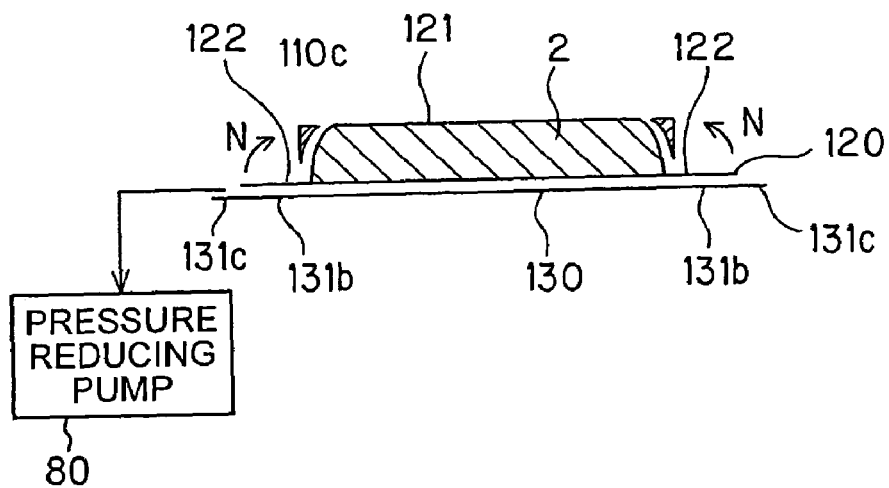
FIG. 28 is a sectional view showing a state that a frame is disposed in the periphery of the housed battery element.

At this time, as shown in FIG. 28, a pressure reducing pump 80 is used to reduce pressure in a space for accommodating the battery element 2 which is formed by the first package body 120 and the second package body 130 as well as the uniting. Thus, the battery element 2 is covered with and sealed by the first package body 120 and the first area 131 of the second package body 130. At this time, the cathode terminal 21 and the anode terminal 22 of the battery element 2 are sandwiched in between the uniting surfaces of the first package body 120 and the second package body 130 to be drawn outside the package body.

Here, the pressure is reduced to suck the inner part of the housing recessed part 121 of the first package body 120. Thus, as shown in FIG. 28, the battery element 2 accommodated in the housing recessed part 121 of the first package body 120 is drawn by the first package body 120 to have a substantially trapezoidal form in section in which the second surface side of the battery element 2 as the bottom surface side of the housing recessed part 121 is small and the first surface side as an opening side is large.

Subsequently, the cathode terminal 21 and the anode terminal 22 are connected to a terminal part of the connecting board 3. Then, as shown by an arrow mark L in FIG. 29, in the periphery of the battery element 2 covered and sealed with the first package body 120 and the second package body 130, the frame 110 is disposed from the first package body 120 side. The fixing member 140 for supporting the connecting board 3 to which the cathode terminal 21 and the anode terminal 22 are connected is arranged in the frame 110.

At this time, the fixing member 140 is disposed in the frame 110 so that the engaging protrusions 142 of the fixing member 140 are engaged with the engaging recessed parts 112 formed in the frame 110 to fix the connecting board 3 in the frame 110. Further, the frame 110 is disposed in the periphery of the battery element 2, so that even when the battery element 2 is not disposed in a plastic case, the same mechanical strength and reliability of the terminals as those when the plastic case is used can be ensured. As described above, the battery element 2 has a substantially trapezoidal shape in section under a reduced pressure. Thus, as shown in FIG. 28, the side surface walls 110c of the frame 110 are arranged in space parts formed in the peripheral edge parts of the second surface side of the battery element 2. Accordingly, a dead space can be effectively utilized to more improve volume efficiency.

Figure 30:
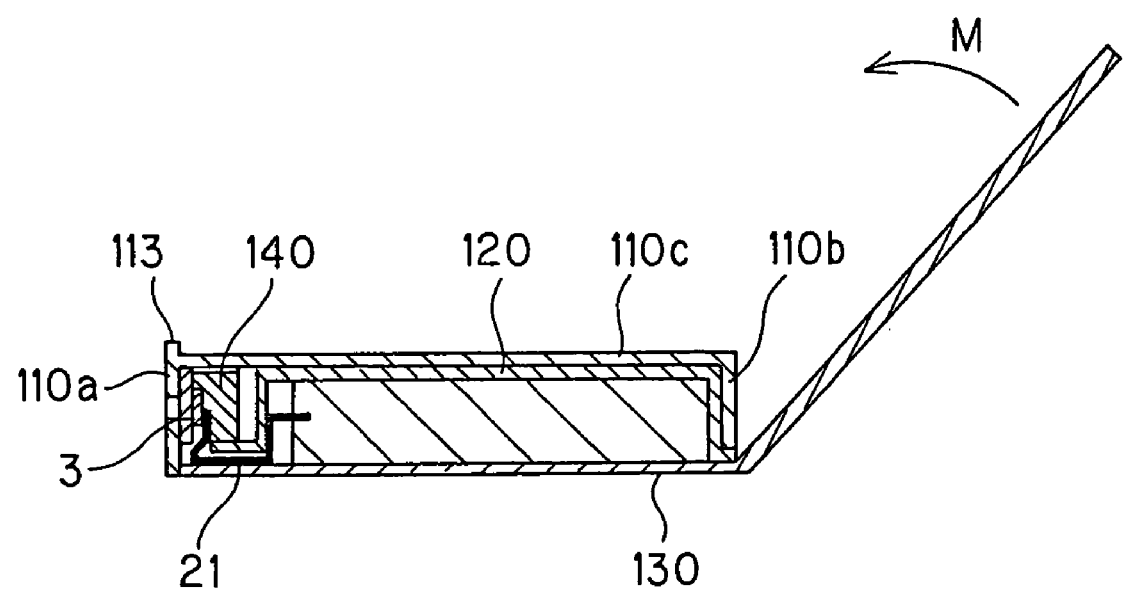
FIG. 30 is a sectional view showing a state that the periphery of the battery element is covered with the second package body.

Then, as shown in an arrow mark M in FIGS. 29 and 30, the second area 132 of the second package body 130 is bent to the second surface side of the battery element 2 accommodated in the housing recessed part 121 of the first package body 120 along a boundary relative to the first area 131 and arranged on the frame 110 in the periphery of the housing recessed part 121. Then, the second area 132 of the second package body 130 with which the housing recessed part 121 of the first package body 120 is covered is heat-sealed to the side wall parts 110c of the frame 110 to cover the housing recessed part 121 of the first package body 120 with the second package body 130. At this time, as shown in FIG. 22, the end parts of the second area 132 of the second package body 130 abut on the third step parts 115.

Further, at this time, the uniting parts of the uniting pieces 122 of the first package body 120 and the uniting parts 131b of the first area 131 of the second package body 130 are bent as shown by arrow marks N in FIGS. 28 and 29 and arranged in the side wall parts 110c of the frame 110 provided in the periphery of the battery element 2 as shown in FIG. 22.

After that, the margin parts 131c of the first area 131 of the second package body 130 are heat-sealed to the side wall parts 110c of the frame 110. As shown in FIG. 22, the uniting pieces 122 of the first package body 120 abut on the first step parts 113 and the margin parts 131c of the first area 131 of the second package body 130 abut on the second step parts 114 so that the battery pack 100 is completed.

As described above, the margin parts 131c of the first area 131 of the second package body 130 are heat-sealed to the side wall parts 110c of the frame 110. Thus, the uniting pieces 122 of the first package body 120 abut on the first step parts 113 and the margin parts 131c of the first area 131 of the second package body 130 abut on the second step parts 114. As a result, a short-circuit between the first package body 120 and the second package body 130 is prevented.

Further, the thickness of the first step parts 113 and the second step parts 114 is respectively substantially the same as those of the first package body 120 and the second package body 130. Accordingly, the first package body 120 and the second package body 130 are heat-sealed to the side wall parts 110c of the frame 110 so that the side wall parts 110c of the frame 110 are flush. Thus, the first package body 120 and the second package body 130 are prevented from being separated.

In the battery pack 100 obtained in such a manner, the second package body 130 made of the laminate film is used also as the outer package material of the pack. Accordingly, volume efficiency can be improved more by 10% or higher than that obtained when the plastic case is used as an outer package material. Thus, the volume density of the battery pack 100 can be improved.

In the battery pack 100, since the second package body 130 exposed outside the pack is harder than the first package body 120 accommodated in the pack, the battery element 2 is prevented from being deformed or deteriorated in the inner part due to an external impact such as an impact owing to falling and the generation of flaws on the outer surface of the pack is suppressed. Accordingly, in the battery pack 100, an external appearance is prevented from being poor.

In the battery pack 100, when the housing recessed part 121 of the first package body 120 is covered with the second area 132 of the second package body 130, the second area 132 of the second package body 130 is bent to the second surface side of the battery element 2 along the short side as the boundary relative to the first area 131. Thus, the bent part is short, so that the generation of wrinkles or the like on the bent part is suppressed to improve an external appearance.

Further, in the battery pack 100, when the second package body 130 is united to the frame 110, the polypropylene layers 123 and 133 thereof are heat-sealed together. Therefore, an assured and stable uniting can be obtained in a short time by the margin parts 131c of small areas provided in the second package body 130.

Fourth Embodiment

Figure 31:
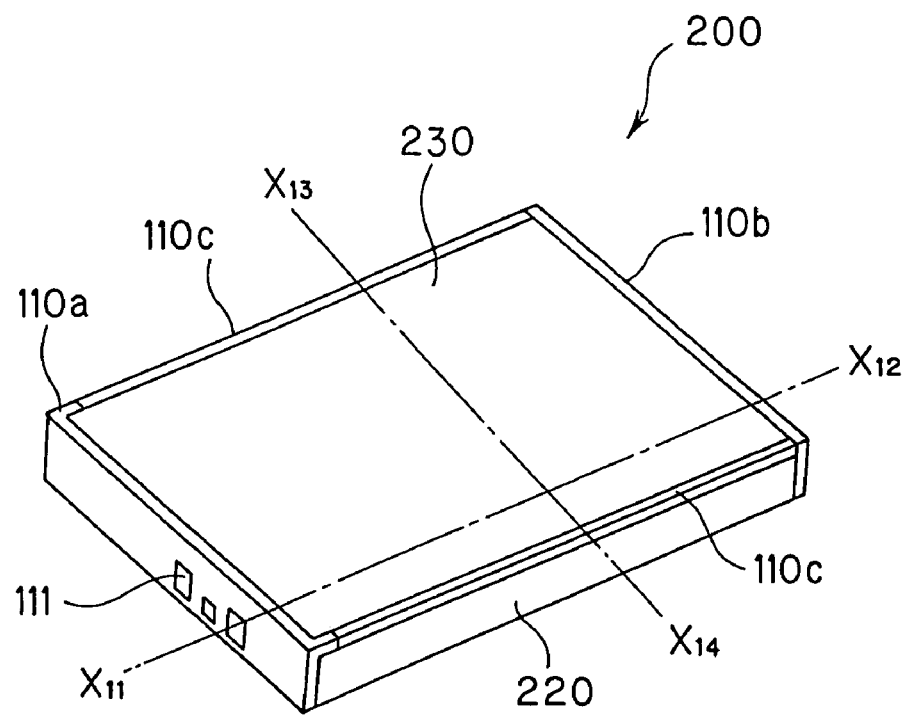
FIG. 31 is a perspective view showing one structural example of a battery pack to which the present invention is applied.
Figure 32:
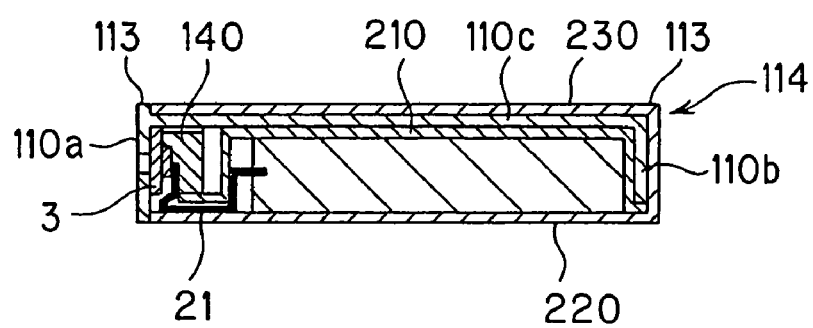
FIG. 32 is a sectional view taken along a line $X_{11}$-$X_{12}$ in FIG. 31.

Now, a battery pack 200 having two package bodies for packing the outer part of a pack, which is different from the above-described battery pack 100, will be described by referring to FIGS. 31 and 32.

The battery pack 200 comprises a battery element 2, a connecting board 3, a frame 110, a first package body 210 for packing an inner part of the pack, a second package body 220 and a third package body 230 for packing an outer part of the pack and a fixing member 140. In the battery pack 200, the connecting board 3 and the frame 110 are disposed in the periphery of the battery element 2 packed by the first package body 210 and the second package body 220 to unite the third package body 230 to the frame 110. Thus, the second package body 220 and the third package body 230 serve also as an outer package material of the pack.

Since the battery element 2, the connecting board 3 and the fixing member 140 have the substantially same structures as the battery element 2, the connecting board 3, the frame 110 and the fixing member 140 of the battery pack 100 according to the above-described third embodiment, these members are designated by the same reference numerals in the drawings and the detailed description thereof will be omitted.

Figure 33:
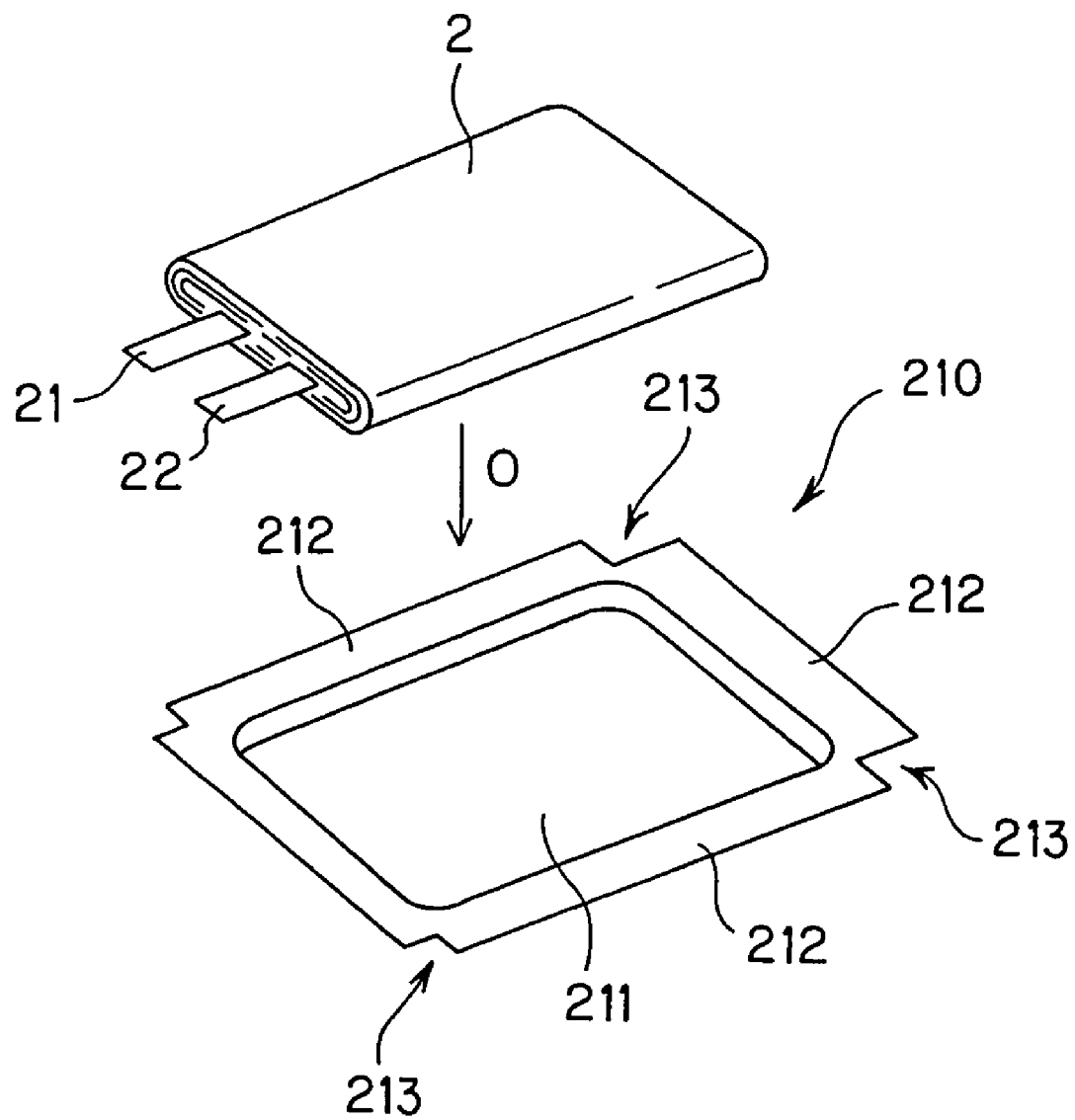
FIG. 33 is a perspective view showing a state that a battery element is housed in a housing recessed part.

The first package body 210 has, as shown in FIG. 33, a substantially rectangular form and a housing recessed part 211 previously formed in which the battery element 2 is accommodated. In the periphery of the housing recessed part 211, uniting pieces 212 to be united to the below-described second package body 220 are provided. In both the ends of both short sides of the first package body 210, cut-out parts 213 are formed.

The first package body 210 has the same material and the same structure as those of the first package body 120 of the above-described third embodiment. Accordingly, the detailed explanation thereof will be omitted.

Figure 34:
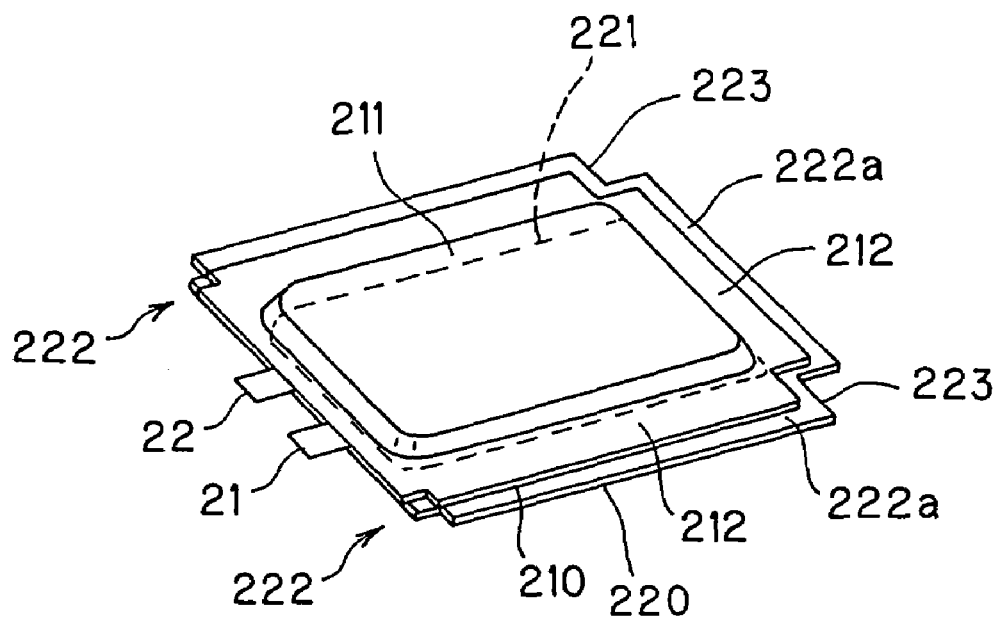
FIG. 34 is a perspective view showing a state that a second package body is superposed on a first package body.
Figure 35:
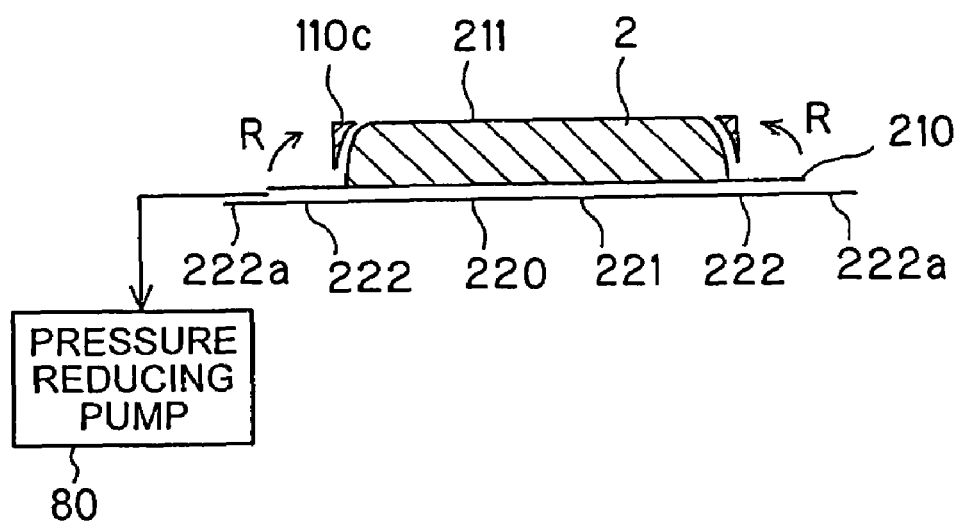
FIG. 35 is a sectional view showing a state that the second package body is superposed on the first package body.

The second package body 220 is formed in a substantially rectangular shape and includes, as shown in FIGS. 34 and 35, a cover part 221 with which a first surface of the battery element 2 housed in the housing recessed part 211 of the first package body 210 which is exposed outside is covered and uniting parts 222 to be united to the uniting pieces 212 of the first package body 210.

The cover part 221 has the substantially same area as that of the first surface of the battery element 2. The uniting part 222 is formed to be larger than the uniting piece 212 of the first package body 210 both in the directions of a long side and a short side. The parts of the uniting part 222 larger than the uniting piece 212 of the first package body 120 serve as margin parts 222a to be united to the side wall parts 110c of the frame 110. In the margin parts 222a, polypropylene layers 133 are exposed to the first package body 210 side. In the second package body 220, cut-out parts 223 are provided at both ends of one short side like the first package body 210.

The second package body 220 having the above described structure is united to the first package body 210 to cover the first surface of the battery element 2 therewith and form one main surface of the battery pack 200. Further, the uniting parts of the uniting parts 222 of the second package body 220 and the uniting pieces 212 of the first package body 210 form side surfaces of the battery pack 200 by uniting the side wall parts 110c of the frame 110 to the margin parts 222a of the uniting parts 222.

The third package body 230 is formed in a substantially rectangular shape to cover the housing recessed part 211 of the first package body 210 through the frame 110 from a second surface side opposite to the first surface of the battery element 2. On one short side of the third package body 230, cut-out parts 231 are formed so as to correspond to recessed parts formed in the front wall part 110a of the frame 110. The third package body 230 is united to the frame 110 to cover the housing recessed part 211 of the first package body 210 therewith and form the other main surface of the battery pack 200.

The above-described second package body 220 and the third package body 230 are respectively composed of resin layers and metal layers and have the same materials and structures as those of the second package body 130 of the third embodiment. Accordingly, the detailed explanation thereof will be omitted.

Now, a method for producing the battery pack 200 having the above-described structure will be described below. Firstly, as shown by an arrow mark O in FIG. 33, the battery element 2 is accommodated in the housing recessed part 211 of the first package body 210. At this time, the terminals of the battery element 2 are drawn to one short side of the first package body 210.

Then, as shown in FIG. 34, the second package body 220 is superposed on the first package body 210 from a side in which the battery element 2 is exposed so that the polypropylene layer 133 of the second package body 220 is located in the first package body 210 side. Thus, the first surface of the battery element 2 housed in the housing recessed part 211 of the first package body 210 which is exposed outside is covered with the second package body 220.

Then, the first package body 210 is united to the second package body 220. When the first package body 210 is united to the second package body 220, the polypropylene layers 123 of the uniting pieces 212 of the first package body 210 are united to the polypropylene layers 133 of the uniting parts 222 of the second package body 220 by heat-sealing them at about 170° C. in the four sides of the periphery of the battery element 2 housed in the housing recessed part 211.

At this time, as shown in FIG. 35, a pressure reducing pump 80 is used to reduce pressure as well as the uniting. Thus, the battery element 2 is covered with and sealed by the first package body 210 and the second package body 220. At this time, a cathode terminal 21 and an anode terminal 22 of the battery element 2 are sandwiched in between the uniting surfaces of the first package body 210 and the second package body 220 to be drawn outside the package body.

Here, the pressure is reduced to suck the inner part of the housing recessed part 211 of the first package body 210. Thus, as shown in FIG. 35, the battery element 2 accommodated in the housing recessed part 211 of the first package body 210 is drawn by the first package body 210 to have a substantially trapezoidal form in section in which the second surface side of the battery element 2 as the bottom surface side of the housing recessed part 211 is small and the first surface side as an opening side is large.

Subsequently, the cathode terminal 21 and the anode terminal 22 are connected to a terminal part of the connecting board 3. Then, as shown by an arrow mark P in FIG. 36, in the periphery of the battery element 2 covered and sealed with the first package body 210 and the second package body 220, the frame 110 is disposed from the first package body 210 side. The fixing member 140 for supporting the connecting board 3 to which the cathode terminal 21 and the anode terminal 22 are connected is arranged in the frame 110.

At this time, the connecting board 3 and the fixing member 140 are disposed together in the frame 110 so that the engaging protrusions 142 of the fixing member 140 are engaged with engaging recessed parts 112 formed in the frame 110 to fix the connecting board 3 to the frame 110. Further, the frame 110 is disposed in the periphery of the battery element 2, so that even when the battery element 2 is not accommodated in a plastic case, the same mechanical strength and reliability of the terminals as those when the plastic case is used can be ensured. As described above, the battery element 2 has a substantially trapezoidal shape in section under a reduced pressure. Thus, as shown in FIG. 35, the side surface walls 110c of the frame 110 are arranged in space parts formed in the peripheral edge parts of the second surface side of the battery element 2. Accordingly, a dead space can be effectively utilized to more improve volume efficiency.

Figure 36:
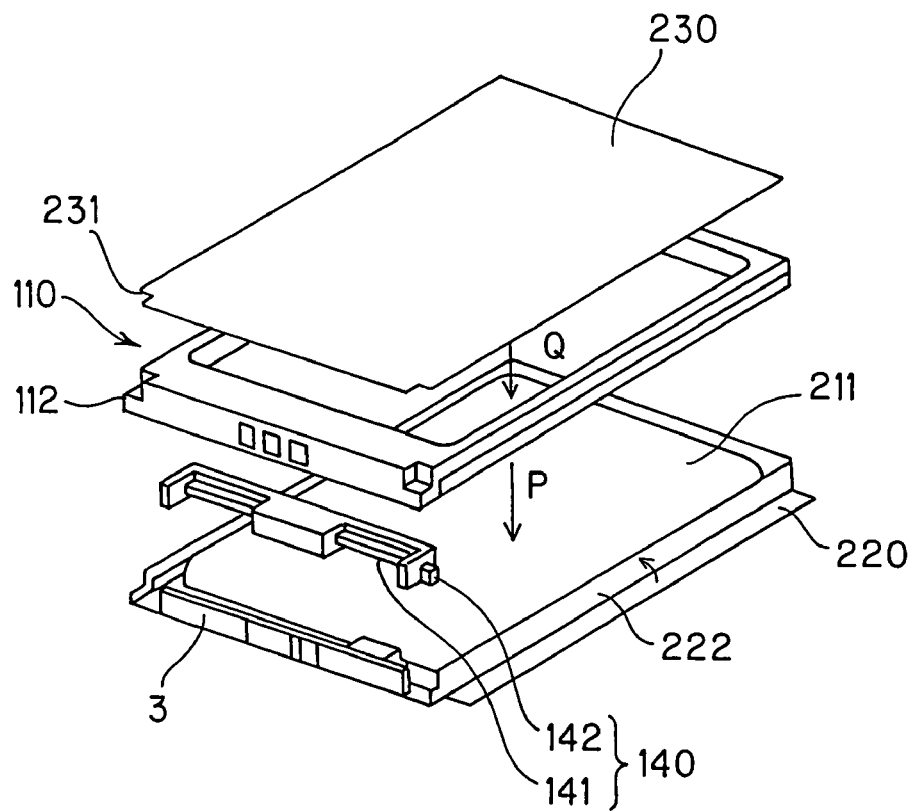
FIG. 36 is an exploded perspective view showing a state that a frame is arranged in the periphery of the battery element housed in the housing recessed part.

Then, as shown in an arrow mark Q in FIG. 36, the third package body 230 is disposed on the upper wall parts 110d of the frame 110 arranged in the periphery of the housing recessed part 211 of the first package body 210 so that the polypropylene layer 133 of the third package body 230 is located in the housing recessed part 211 side. Then, the polypropylene layer 133 of the third package body 230 is heat-sealed to the frame 110 at about 170° C. In accordance with the heat sealing process, the end parts of the third package body 230 abut on third step parts 115 provided in the frame 110 so that the upper wall parts 110d of the frame 110 are flush.

Figure 37:
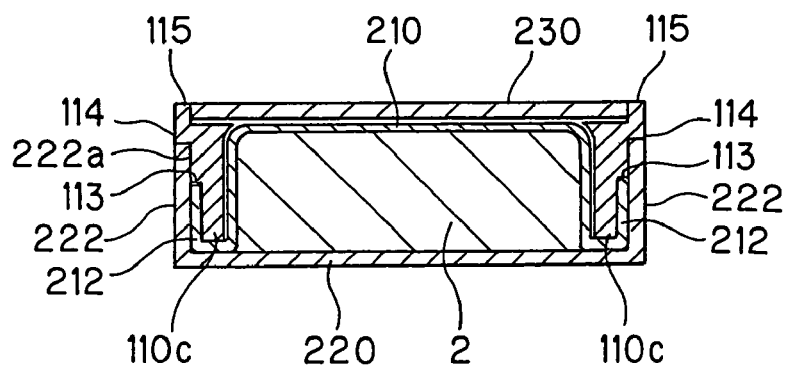
FIG. 37 is a sectional view taken along a line $X_{13}$-$X_{14}$ in FIG. 31.

Further, at this time, the uniting parts of the uniting pieces 212 of the first package body 210 and the uniting parts 222 of the second package body 220 are bent as shown by arrow marks R in FIG. 35 and arranged along the side wall parts 110c of the frame 110 provided in the periphery of the battery element 2. After that, the margin parts 222a of the second package body 220 are heat-sealed to the side wall parts 110c of the frame 110. As shown in FIG. 37, the uniting pieces 212 of the first package body 210 abut on first step parts 113 and the second package body 220 abut on second step parts 114 in accordance with the heat sealing process so that the side wall parts 110c of the frame 110 are flush and the battery pack 200 is completed.

As described above, the margin parts 222a of the second package body 220 are heat-sealed to the side wall parts 110c of the frame 110. Thus, the uniting pieces 212 of the first package body 210 abut on the first step parts 113 and the end parts of the margin parts 222a of the second package body 220 abut on the second step parts 114. As a result, a short-circuit between the first package body 210 and the second package body 220 is prevented. Further, the width of the first step parts 113 and the second step parts 114 is respectively substantially the same as the thickness of the first package body 210 and the second package body 220. Accordingly, the first package body 210 and the second package body 220 are heat-sealed to the side wall parts 110c of the frame 110 so that the side wall parts 110c of the frame 110 are flush. Thus, the first package body 210 and the second package body 220 are prevented from being peeled off.

In the battery pack 200 obtained in such a manner, the second package body 220 and the third package body 230 made of the laminate film are used also as the outer package material of the pack. Accordingly, volume efficiency can be improved more by 10% or higher than that obtained when the plastic case is used as an outer package material.

In the battery pack 200, since the second package body 220 and the third packager body 230 for packing the outer part of the pack are harder than the first package body 210 accommodated in the pack, the battery element 2 is prevented from being deformed or deteriorated in the inner part due to an external impact such as an impact owing to falling and the generation of flaws on the outer surface of the pack is suppressed. Accordingly, in the battery pack 200, an external appearance is prevented from being poor.

Further, in the battery pack 200, when the second package body 220 is united to the frame 110, the polypropylene layers 123 and 133 thereof are heat-sealed together. Therefore, an assured and stable uniting can be obtained in a short time by the margin parts 222a of small areas provided in the second package body 220.

Although the battery packs according to the embodiments of the present invention are described above, the present invention is not limited thereto and may be properly changed as desired within a scope of the invention without departing the gist of the invention.

According to the present invention, the laminate material of the battery element is used also as the outer package material of the pack. Accordingly, volume efficiency can be improved more by 10% or higher than that obtained when the plastic case is used as an outer package material. Thus, the battery pack whose volume density is improved can be realized. Further, the parts such as the case, the tape, the label, etc. necessary when the plastic case is used are not necessary so that the number of parts can be reduced and the material cost can be reduced.

Further, in the present invention, the frame is disposed in the periphery of the battery element, the same mechanical strength and reliability of the terminals obtained when the plastic case is used can be maintained to realize the battery pack with high reliability.

Still further, in the present invention, the laminate material of the battery element is shared with the package body of the pack, so that a design can be simplified, the battery element and the battery pack can be consistently produced and the process cost can be reduced. Further, a production time can be shortened to improve productivity.

Furthermore, in the battery pack according to the present invention, the package body provided outside the pack is harder than the package body provided inside the pack. Thus, while the drawing characteristics of a usually soft package body for packing the battery element are effectively utilized, the battery element can be prevented from being deformed or deteriorated in the inner part due to an external impact such as an impact owing to falling and the generation of flaws on the outer surface of the pack can be suppressed. Accordingly, in the battery pack, an external appearance can be prevented from being poor.

What is claimed is:

1. A battery pack comprising:
   (a) a battery element having a cathode, an anode, a polymer electrolyte, and terminals extending from the cathode and the anode;
   (b) a package body having (i) a first area with a housing recessed part in which the battery element is housed, (ii) a second area contiguous to and extending from the first area, the second area and the first area separated by a first folding edge, the first folding edge located in a side opposite to that of the terminals relative to the first area, the second area overlying an exposed upper surface of the battery element, and (iii) a third area contiguous to and extending from the second area so as to extend in a direction substantially perpendicular to the first area, the third area and the second area separated by a second folding edge;

(c) a frame disposed along a periphery of the housing recessed part, the frame comprising (i) a front wall part disposed in the terminal side of the battery element, (ii) a rear wall part disposed in a side opposite to the terminals of the battery element and (iii) side wall parts disposed in the side surface parts of the battery element, the frame surrounding the first, second and third areas along a thickness direction of the battery element; and (d) a connecting board disposed in the frame to which the terminals are connected and having a terminal part electrically connected to an external device, wherein, the packaged body is folded along the first folding edge so that the second area is in contact with the first area along a periphery of the battery element, the terminals of the battery element are connected to the connecting board, and the packaged body is folded along the second folding edge so that the third area overlies and is in contact with an exposed surface of the first area.

2. The battery pack according to claim 1, wherein a space formed by the housing recessed part of the first area and the second area and in which the battery element is housed is sealed under a pressure reduced state.

3. The battery pack according to claim 1, wherein the package body is formed by laminating polypropylene, aluminum, nylon in order from inside, and polypropylene sides are opposed and united to each other by heat-sealing.

4. A battery pack comprising:

(a) a battery element having a cathode, an anode, a polymer electrolyte, and terminals extending from the cathode and the anode;

(b) a first package body having a housing recessed part in which the battery element is housed and a uniting piece provided along a periphery of the housing recessed part;

(c) a second package body having at least a first area with which an exposed first surface of the battery element is covered and a second area with which a second surface side opposite to the first surface is covered;

(d) a frame disposed along the periphery of the housing recessed part, the frame comprising (i) a front wall part disposed in the terminal side of the battery element, (ii) a rear wall part disposed in a side opposite to the terminals of the battery element and (iii) side wall parts disposed in the side surface parts of the battery element, the frame surrounding the first, second and third areas along a thickness direction of the battery element; and (e) a connecting board disposed in the frame to which the terminals are connected and having a terminal part electrically connected to an external device, wherein, the uniting piece is united to the first area, the terminals of the battery element are connected to the connecting board, the second area of the second package body is bent along a first folding edge relative to the first area, the second surface side opposite to the first surface of the battery element housed in the housing recessed part of the first package body and covered with the first area is covered with the second area, and the first package body is united to the second area of the second package body.

5. The battery pack according to claim 4, wherein the second package body is made of a harder material than that of the first package body.

6. The battery pack according to claim 4, wherein the first package body is formed by laminating polypropylene, aluminum, nylon in order from inside, united by heat-sealing polypropylene sides, and the second package body is united to the first package body so as to be located inside the outer line of the uniting piece of the first package body and in such a manner that a surface located inside when the first package body is covered with the second area is opposed to the first surface side of the first package body.

7. A battery pack comprising:

(a) a battery element having a cathode, an anode, a polymer electrolyte, and terminals being drawn from the cathode and the anode, respectively;

(b) a first package body with a housing recessed part in which the battery element and a uniting piece provided along a periphery of the housing recessed part;

(c) a second package body having at least a first area that covers an exposed first surface of the battery element is covered and a second area contiguous to and extending from the first area, the second area and the firs area separated by a first folding edge, and the second package body being harder than the first package body;

(d) a frame disposed along the side periphery of the housing recessed part, the frame comprising (i) a front wall part disposed in the terminal side of the battery element, (ii) a rear wall part disposed in a side opposite to the terminals of the battery element and (iii) side wall parts disposed in the side surface parts of the battery element, the frame surrounding the first, second and third areas along a thickness direction of the battery element; and (e) a connecting board disposed in the frame to which the terminals are connected, wherein, the uniting piece of the first package body is united to the first area of the second package body, the terminals of the battery element are connected to the connecting board, and the second package body is folded along the first folding edge to cover a second surface of the battery element opposite to the first surface of the battery element relative to the first area united to the uniting piece of the first package body by using the one side of the first area as a supporting point to cover the housing recessed part of the first package body with the second area of the second package body and unite the second area of the second package body to the frame.

8. The battery pack according to claim 7, wherein the second package body is a laminate film formed by laminating a resin layer and a metal layer and the Vickers hardness of the metal layer is 50 Hv or higher and 100 Hv or lower.

9. The battery pack according to claim 7, wherein in one end side of a side surface of the frame, a first step is provided with which the end part of the bent back uniting piece of the first package body is engaged, a second step is provided with which the end part of the first area of the second package body is engaged in the other end side of a side surface on which the first step is provided and a third step is provided with which the end part of the second area of the second package body is engaged in the other end side of the frame.

10. A battery pack comprising:
(a) a battery element having a cathode, an anode, a polymer electrolyte, and terminals being drawn from the cathode and the anode, respectively;
(b) a first package body with a housing recessed part in which the battery element is housed and a uniting piece provided along a periphery of the housing recessed part;
(c) a second package body which covers an exposed first surface of the battery element is, and is harder than the first package body;
(d) a third package body which covers a second surface of the battery element opposite to the first surface of the battery element and which is harder than the first package body;
(e) a frame disposed along the side periphery of the housing recessed part in which the battery element is housed; the frame comprising (i) a front wall part disposed in the terminal side of the battery element, (ii) a rear wall part disposed in a side opposite to the terminals of the battery element and (iii) side wall parts disposed in the side surface parts of the battery element, the frame surrounding the first, second and third areas along a thickness direction of the battery element; and
a connecting board disposed in the frame to which the terminals are connected,
wherein,
the terminals of the battery element are drawn outside by uniting the uniting piece of the first package body to the second package body, and are connected to the connecting board, and
the frame provided in the periphery of the battery element is united to the third package body.

11. The battery pack according to claim 10, wherein the second package body and the third package body are laminate films respectively formed by laminating a resin layer and a metal layer and the Vickers hardness of the metal layer is 50 Hv or higher and 100 Hv or lower.

12. The battery pack according to claim 10, wherein in one end side of a side surface of the frame, a first step is provided with which the end part of the bent back uniting piece of the first package body is engaged, a second step is provided with which the end part of the second package body is engaged in the other end side of a side surface on which the first step is provided and a third step is provided with which the end part of the third package body is engaged in the other end side of the frame.

* * * * *